(12) United States Patent
Shimatani et al.

(10) Patent No.: US 9,857,586 B2
(45) Date of Patent: Jan. 2, 2018

(54) REFLECTIVE PROJECTION DISPLAY DEVICE

(71) Applicant: SHARP KABUSHIKI KAISHA, Sakai, Osaka (JP)

(72) Inventors: Takafumi Shimatani, Sakai (JP); Naru Usukura, Sakai (JP); Hiromi Katoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/306,895

(22) PCT Filed: Apr. 23, 2015

(86) PCT No.: PCT/JP2015/062337
§ 371 (c)(1),
(2) Date: Oct. 26, 2016

(87) PCT Pub. No.: WO2015/166872
PCT Pub. Date: Nov. 5, 2015

(65) Prior Publication Data
US 2017/0052369 A1 Feb. 23, 2017

(30) Foreign Application Priority Data
Apr. 30, 2014 (JP) ................. 2014-093694

(51) Int. Cl.
*G02B 27/01* (2006.01)
*B60K 35/00* (2006.01)
*G02B 27/28* (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC .... G03B 21/006; G03B 21/28; G03B 21/145; G03B 21/2033; G03B 21/2053;
(Continued)

(56) References Cited

U.S. PATENT DOCUMENTS 9,360,667 B2 * 6/2016 Chou ................. G02B 27/0101
2001/0030720 A1 * 10/2001 Ichihashi ............. G02B 5/3016
349/106
(Continued)

FOREIGN PATENT DOCUMENTS

WO WO 2007/004286 1/2007

OTHER PUBLICATIONS

International Search Report for PCT/JP2015/062337 dated Jul. 21, 2015, one (1) page.

*Primary Examiner* — Sultan Chowdhury
(74) *Attorney, Agent, or Firm* — ScienBiziP, P.C.

(57) ABSTRACT

A head-up display 10 includes a MEMS mirror component 14 for displaying images and a combiner 12 for reflecting light from the MEMS mirror component 14 so that an observer observes reflected light as a virtual image and for transmitting ambient light. The combiner 12 includes a green light reflecting portion 17 for selectively reflecting mainly green light in a green light wavelength region, a red light reflecting portion 16 for selectively reflecting mainly red light in a red light wavelength region, and a blue light reflecting portion 18 for reflecting blue light in a blue light wavelength region. The light reflecting portions 16 to 18 are laid in layers. The green light reflecting portion 17 is arranged the closest to the MEMS mirror component 14.

12 Claims, 18 Drawing Sheets

(52) U.S. Cl.
CPC .... *G02B 27/286* (2013.01); *B60K 2350/2026* (2013.01); *B60K 2350/2047* (2013.01); *B60K 2350/2052* (2013.01); *B60K 2350/2056* (2013.01); *B60K 2350/2069* (2013.01); *G02B 2027/0112* (2013.01); *G02B 2027/0114* (2013.01); *G02B 2027/0118* (2013.01)

(58) Field of Classification Search
CPC ........ G02F 2001/133543; G02F 2001/133623; G02B 27/01; G02B 27/017; G02B 27/0101; G02B 27/281; G02B 27/283
See application file for complete search history.

(56) References Cited

U.S. PATENT DOCUMENTS

| | | | |
|---|---|---|---|
| 2003/0127656 A1* | 7/2003 | Aizawa | H01L 51/5281 257/79 |
| 2008/0143941 A1 | 6/2008 | Tomita et al. | |
| 2011/0096298 A1* | 4/2011 | Huang | G03B 33/12 353/33 |
| 2015/0268467 A1* | 9/2015 | Cakmakci | G03H 1/0248 359/13 |

\* cited by examiner

FIG.5

|  | BLUE LIGHT | GREEN LIGHT | RED LIGHT |
|---|---|---|---|
| MAXIMUM LUMINOUS FLUX OF LASER DIODE (a.u.) | 4.0 | 50.0 | 37.5 |
| PERCENTAGE OF MAXIMUM LUMINOUS FLUX | 4% | 55% | 41% |
| PERCENTAGE OF LUMINOUS FLUX TO OBTAIN TARGET WHITE BALANCE | 2% | 72% | 26% |
| LUMINOUS FLUX OF EXITING LIGHT WITH WHITE BALANCE ADJUSTED BASED ON GREEN LIGHT (a.u.) | 1.4 | 50.0 | 18.2 |
| ABSORPTION RATE OF EACH LIGHT REFLECTING PORTION TO ABSORB CORRESPONDING COLOR OF LIGHT | 30% | 25% | 20% |

FIG.7

| | COMPARATIVE EXAMPLE 1 (RGB) | | | COMPARATIVE EXAMPLE 2 (RBG) | | | COMPARATIVE EXAMPLE 3 (BRG) | | | COMPARATIVE EXAMPLE 4 (BGR) | | |
|---|---|---|---|---|---|---|---|---|---|---|---|---|
| | BLUE LIGHT | GREEN LIGHT | RED LIGHT | BLUE LIGHT | GREEN LIGHT | RED LIGHT | BLUE LIGHT | GREEN LIGHT | RED LIGHT | BLUE LIGHT | GREEN LIGHT | RED LIGHT |
| LUMINOUS FLUX OF INCIDENT LIGHT TO OBTAIN EXITING LIGHT WITH ADJUSTED WHITE BALANCE (a.u.) | 4.4 | 89.5 | 19.9 | 2.8 | 131.1 | 19.9 | 1.5 | 131.1 | 29.2 | 1.5 | 89.5 | 39.8 |
| MAXIMUM RATED LUMINOUS FLUX OF THE INCIDENT LIGHT (a.u.) | 2.4 | 50.0 | 11.1 | 1.1 | 50.0 | 7.6 | 0.6 | 50.0 | 11.1 | 0.9 | 50.0 | 22.2 |
| LUMINOUS FLUX OF EACH COLOR OF EXITING LIGHT (a.u.) | 0.8 | 27.9 | 10.1 | 0.5 | 19.1 | 6.9 | 0.5 | 19.1 | 6.9 | 0.8 | 27.9 | 10.1 |
| LUMINOUS FLUX OF ENTIRE EXITING LIGHT (a.u.) | 38.8 | | | 26.5 | | | 26.5 | | | 38.8 | | |

FIG.8

|  | EXAMPLE 1 (GBR) | | | EXAMPLE 2 (GBR) | | |
|---|---|---|---|---|---|---|
|  | BLUE LIGHT | GREEN LIGHT | RED LIGHT | BLUE LIGHT | GREEN LIGHT | RED LIGHT |
| LUMINOUS FLUX OF INCIDENT LIGHT TO OBTAIN EXITING LIGHT WITH ADJUSTED WHITE BALANCE (a.u.) | 4.4 | 55.0 | 29.2 | 2.8 | 55.0 | 39.8 |
| MAXIMUM RATED LUMINOUS FLUX OF THE INCIDENT LIGHT (a.u.) | 4.0 | 50.0 | 26.5 | 2.5 | 50.0 | 36.1 |
| LUMINOUS FLUX OF EACH COLOR OF EXITING LIGHT (a.u.) | 1.3 | 45.4 | 16.5 | 1.3 | 45.4 | 16.5 |
| LUMINOUS FLUX OF ENTIRE EXITING LIGHT (a.u.) | 63.2 | | | 63.2 | | |

FIG.12

| | BLUE LIGHT | GREEN LIGHT | RED LIGHT |
|---|---|---|---|
| MAXIMUM LUMINOUS FLUX OF LED (a.u.) | 1.8 | 10.0 | 5.0 |
| PERCENTAGE OF MAXIMUM LUMINOUS FLUX | 10% | 60% | 30% |
| PERCENTAGE OF LUMINOUS FLUX TO ACHIEVE TARGET WHITE BALANCE | 2% | 72% | 26% |
| LUMINOUS FLUX OF EXITING LIGHT WITH WHITE BALANCE ADJUSTED BASED ON GREEN LIGHT (a.u.) | 0.3 | 10.0 | 3.6 |
| ABSORPTION RATE TO ABSORB CORRESPONDING COLOR OF LIGHT BY EACH LIGHT REFLECTING PORTION | 30% | 25% | 20% |

FIG.13

|  | COMPARATIVE EXAMPLE 5 (RGB) | | | COMPARATIVE EXAMPLE 6 (RBG) | | | COMPARATIVE EXAMPLE 7 (BRG) | | | COMPARATIVE EXAMPLE 8 (BGR) | | |
| --- | --- | --- | --- | --- | --- | --- | --- | --- | --- | --- | --- | --- |
|  | BLUE LIGHT | GREEN LIGHT | RED LIGHT | BLUE LIGHT | GREEN LIGHT | RED LIGHT | BLUE LIGHT | GREEN LIGHT | RED LIGHT | BLUE LIGHT | GREEN LIGHT | RED LIGHT |
| LUMINOUS FLUX OF INCIDENT LIGHT TO OBTAIN EXITING LIGHT WITH ADJUSTED WHITE BALANCE (a.u.) | 0.9 | 17.9 | 4.0 | 0.6 | 26.2 | 4.0 | 0.3 | 26.2 | 5.8 | 0.3 | 17.9 | 7.9 |
| MAXIMUM RATED LUMINOUS FLUX OF THE INCIDENT LIGHT (a.u.) | 0.5 | 10.0 | 2.2 | 0.2 | 10.0 | 1.5 | 0.1 | 10.0 | 2.2 | 0.2 | 10.0 | 4.4 |
| LUMINOUS FLUX OF EACH COLOR OF EXITING LIGHT (a.u.) | 0.2 | 5.6 | 2.0 | 0.1 | 3.8 | 1.4 | 0.1 | 3.8 | 1.4 | 0.2 | 5.6 | 2.0 |
| LUMINOUS FLUX OF ENTIRE EXITING LIGHT (a.u.) | 7.8 | | | 5.3 | | | 5.3 | | | 7.8 | | |

FIG.14

| | EXAMPLE 3 (GBR) | | | EXAMPLE 4 (GBR) | | |
|---|---|---|---|---|---|---|
| | BLUE LIGHT | GREEN LIGHT | RED LIGHT | BLUE LIGHT | GREEN LIGHT | RED LIGHT |
| LUMINOUS FLUX OF INCIDENT LIGHT TO OBTAIN EXITING LIGHT WITH ADJUSTED WHITE BALANCE (a.u.) | 0.9 | 11.0 | 5.8 | 0.6 | 11.0 | 7.9 |
| MAXIMUM RATED LUMINOUS FLUX OF THE INCIDENT LIGHT (a.u.) | 0.8 | 9.4 | 5.0 | 0.4 | 6.9 | 5.0 |
| LUMINOUS FLUX OF EACH COLOR OF EXITING LIGHT (a.u.) | 0.2 | 8.6 | 3.1 | 0.2 | 6.3 | 2.3 |
| LUMINOUS FLUX OF ENTIRE EXITING LIGHT (a.u.) | 11.9 | | | 8.7 | | |

REFLECTIVE PROJECTION DISPLAY DEVICE

This application is the U.S. national phase of International Application No. PCT/JP2015/062337 filed 23 Apr. 2015 which designated the U.S. and claims priority to JP Patent Application No. 2014-093694 filed 30 Apr. 2014, the entire contents of each of which are hereby incorporated by reference.

TECHNICAL FIELD

The present invention relates to a reflective projection display device.

BACKGROUND ART

Conventionally, reflective projection display devices configured to display images by reflecting ambient light such as sunlight and interior light. An example of such devices is disclosed in Patent Document 1. Patent Document 1 discloses a multilayer color cholesteric liquid crystal display element including a first blue liquid crystal layer, a second green liquid crystal layer, and a third red liquid crystal layer laid in layers sequentially from the component observation side. The multilayer color cholesteric liquid crystal display element further includes green cut filter layers for selectively absorbing light beams having a wavelength of 600 nm or less between the green liquid crystal layer and the red liquid crystal layer. According to the configuration, unnecessary color noises can be removed.

RELATED ART DOCUMENT

Patent Document

Patent Document 1: International Publication No. 2007/004286

Problem to be Solved by the Invention

As described above, the color cholesteric liquid crystal display element in Patent Document 1 includes the first blue liquid crystal layer, the second green liquid crystal layer, and the third red liquid crystal layer laid in layers sequentially from the component observation side. These layers increase an amount of the reflected ambient light. Each of the first blue liquid crystal layer, the second green liquid crystal layer, and the third red liquid crystal layer that are laid in layers can absorb light. A light absorbing rate tends to be higher for light having a shorter wavelength. In the reflective projection liquid crystal display device using the ambient light disclosed in Patent Document 1, light emitting strength of the ambient light does not have dependency on wavelength. The light absorbing rate for blue light is the highest. Therefore, with the blue liquid crystal layer that reflects the blue light disposed the closest to the element observation side, the blue light is less likely absorbed by the green liquid crystal layer and the red liquid crystal layer. According to the configuration, the amount of the reflected ambient light will increase.

There is a reflective projection display device configured to reflect light from a light source such as a laser diode and an LED for an observer observes reflected light as an virtual image. In such a reflective projection display device, the light source has a specific emission spectrum unlike the ambient light. Namely, light emitting intensity of the light source to emit the light has a dependency on wavelength. Therefore, if the light from the light source is reflected by the color cholesteric liquid crystal display element disclosed in Patent Document 1, the amount of light used for displaying images may decrease.

DISCLOSURE OF THE PRESENT INVENTION

The present invention was made in view of the above circumstances. An object is to increase an amount of light used for displaying images.

Means for Solving the Problem

A reflective projection display device according to the present invention includes a display component for display images and a wavelength selective reflecting member for reflecting light from the display component so that an observer observes reflected light as a virtual image and for transmitting ambient light. The wavelength selective reflecting member includes a green light reflecting portion, a red light reflecting portion, and a blue light reflecting portion. The green light reflecting portion is for selectively reflecting mainly green light in a green wavelength region. The red light reflecting portion is for selectively reflecting mainly red light in a red wavelength region. The blue light reflecting portion is for selectively reflecting mainly blue light in a blue wavelength region. The green light reflecting portion, the red light reflecting portion, and the blue light reflecting portion are laid in layers. The green light reflecting portion is arranged the closest to the display component.

According to the configuration, the light from the display component for display images is reflected by the wavelength selective reflecting member and the reflected light is viewed by the observer as the virtual image. The virtual image observed by the observer is formed from green, red, and blue light components in corresponding color wavelength regions selectively reflected by the green light reflecting portion, the red light reflecting portion, and the blue light reflecting portion. The wavelength selective reflecting member reflects components of ambient light corresponding with the reflectance spectra of the green light reflecting portion, the red light reflecting portion, and the blue light reflecting portion but does not reflect components of the ambient light not corresponding with the reflectance spectra. Therefore, the observer can properly observe an external image formed from components of the ambient light passed through the wavelength selective reflecting member with high transmissivity while observing the virtual image formed from the reflected components of light from the wavelength selective reflecting member with high brightness.

The light reflecting portions of the wavelength selective reflecting member are laid in layers. Therefore, light reflected by the light reflecting portion arranged the farthest from the display component is absorbed by the light reflecting portion arranged the closest to the display component. As a result, an amount of light tends to decrease. The absorption rate of each light reflecting portion tends to increase to absorb light on a short wavelength side. Unlike the ambient light, an emission intensity with which the light is emitted from the display component has wavelength dependency. To maintain white balance, an amount of green light in the green wavelength region tends to be the largest in the light.

Therefore, as described above, the green light reflecting portion of the wavelength selective reflecting member is arranged the closest to the display component. The green light in the green wavelength region included in the light with the largest amount to maintain the white balance is efficiently reflected and thus the amount of light used for displaying images can be increased while the white balance is maintained at a proper level. Furthermore, relative luminous efficiency of the green light is higher than those of the red light and the blue light. By increasing the amount of light used for displaying images as described above, the brightness increases.

Embodiments of the present invention may include the following configurations as preferable configurations.

(1) The reflective projection display device may further include a light source for supplying the red light, the green light, and the blue light. A full width at half maximum in an emission spectrum of each color of light may be equal to or less than 1 nm. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 6 nm to 11 nm exclusive. According to the configuration, colors of light emitted by the light source are reflected by the respective light reflecting portions of the wavelength selective reflecting member with reflectivity in a range from 80% to 87.5% exclusive. Therefore, a virtual image formed from the reflected light from the wavelength selective reflecting member can be observed by the observer with high brightness. The full width at half maximum in the emission spectrum of the light source is equal to or less than 1 nm, which is significantly small. If a wavelength shift occurs in the reflected light due to a variation in incident angle of light entering to each of the light reflecting portions, the reflectivity may significantly decrease. On the other hand, each color of light emitted by the light source includes a small amount of light having a wavelength shifted from a peak wavelength in the emission spectrum (hereinafter referred to as side lobe light). The larger the full width at half maximum in the reflectance spectrum of each of the light reflecting portions, the larger the amount of side lobe light reflected. By setting the full width at half maximum of the reflectance spectrum of each of the reflecting portions as described above, even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 10% to 25% exclusive. Therefore, a wide viewing angle is provided for the observer who observes the virtual image. Because a large amount of ambient light transmitting through the wavelength selective reflecting member is obtained, the observer can properly observe the external image formed from the ambient light. The wavelength shift described above occurs when a condition that a path difference in the reflected light and the wavelength of the light correspond with each other when the light reflecting portions have the periodic structures is satisfied. The wavelength shifts to the short wavelength side as the incident angle increases and to the long wavelength side as the incident angle decreases.

(2) The reflective projection display device may include a light source for supplying the red light, the green light, and the blue light. A full width at half maximum in an emission spectrum of each color of light may be equal to or less than 1 nm. A full width at half maximum in a reflectance spectrum of the red light reflecting portion, a full width at half maximum in a reflectance spectrum of the green light reflecting portion, a full width at half maximum in a reflectance spectrum of the blue light reflecting portion may be in a range from 11 nm to 18 nm exclusive. According to the configuration, colors of light emitted by the light source are reflected by the respective light reflecting portions of the wavelength selective reflecting member with reflectivity in a range from 87.5% to 90% exclusive. Therefore, a virtual image formed from the reflected light from the wavelength selective reflecting member can be observed by the observer with high brightness. The full width at half maximum in the emission spectrum of the light source is equal to or less than 1 nm, which is significantly small. If a wavelength shift occurs in the reflected light due to a variation in incident angle of light entering to each of the light reflecting portions, the reflectivity may significantly decrease. On the other hand, each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 25% to 40% exclusive, which is sufficiently high. Therefore, a wide viewing angle is provided for the observer who observes the virtual image. Because brightness is sufficiently high even when the observer observes the virtual image at an angle, high display quality is provided.

(3) The reflective projection display device may include a light source for supplying the red light, the green light, and the blue light. A full width at half maximum in an emission spectrum of each color of light may be equal to or less than 1 nm. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 18 nm to 90 nm inclusive. According to the configuration, colors of light emitted by the light source are reflected by the respective light reflecting portions of the wavelength selective reflecting member with reflectivity in a range from 90% to 95% inclusive. Therefore, a virtual image formed from the reflected light from the wavelength selective reflecting member can be observed by the observer with high brightness. The full width at half maximum in the emission spectrum of the light source is equal to or less than 1 nm, which is significantly small. If a wavelength shift occurs in the reflected light due to a variation in incident angle of light entering to each of the light reflecting portions, the reflectivity may significantly decrease. On the other hand, each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 40% to 95% inclusive, which is higher. Therefore, a wide viewing angle is provided for the observer who observes the virtual image. Because brightness when the observer observes the virtual image at an angle increases, higher display quality is provided. When the full width at half maximum in the reflectance spectrum of each of the light reflecting portions is maintained equal to or less than 90 nm, the ambient light transmissivity of 70% or higher is achieved and thus the Japanese safety regulations for road vehicles is satisfied.

(4) The reflective projection display device may include a light source for supplying the red light, the green light, and the blue light. A full width at half maximum in an emission spectrum of each color of light may be in a range larger than 1 nm and smaller than 24 nm. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 4 nm to 14 nm exclusive. Each color of light emitted by the light source includes a small amount of light having a wavelength shifted from a peak wavelength in the emission spectrum (hereinafter referred to as side lobe light). The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 20% to 50% exclusive. The observer can observe the virtual image formed form the reflected light from the wavelength selective reflecting member with sufficiently high brightness. Furthermore, because a large amount of ambient light transmitting through the wavelength selective reflecting member is obtained, the observer can further properly observe the external image formed from the ambient light. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 10% to 25% exclusive. Therefore, a wide viewing angle is provided for the observer who observes the virtual image. The wavelength shift described above occurs when a condition that a path difference in the reflected light and the wavelength of the light correspond with each other when the light reflecting portions have the periodic structures is satisfied. The wavelength shifts to the short wavelength side as the incident angle increases and to the long wavelength side as the incident angle decreases.

(5) The reflective projection display device may include a light source for supplying the red light, the green light, and the blue light. A full width at half maximum in an emission spectrum of each color of light may be in a range larger than 1 nm and smaller than 24 nm. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 14 nm to 40 nm. Each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 50% to 80% exclusive, which is sufficiently high. The observer can observe the virtual image formed form the reflected light from the wavelength selective reflecting member with higher brightness. Furthermore, because a sufficient amount of ambient light transmitting through the wavelength selective reflecting member is obtained, the observer can properly observe the external image formed from the ambient light. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 25% to 40% exclusive. Therefore, a wide viewing angle is provided for the observer who observes the virtual image.

(6) The reflective projection display device may include a light source for supplying the red light, the green light, and the blue light. A full width at half maximum in an emission spectrum of each color of light may be in a range larger than 1 nm and smaller than 24 nm. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 40 nm to 90 nm inclusive. Each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 80% to 90% inclusive, which is higher. The observer can observe the virtual image formed form the reflected light from the wavelength selective reflecting member with higher brightness. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 40% to 90% inclusive. Therefore, a wide viewing angle is provided for the observer who observes the virtual image. When the full width at half maximum in the reflectance spectrum of each of the light reflecting portions is maintained equal to or less than 90 nm, the ambient light transmissivity of 70% or higher is achieved and thus the Japanese safety regulations for road vehicles is satisfied.

(7) The reflective projection display device may include a light source for supplying the red light, the green light, and the blue light. A full width at half maximum in an emission spectrum of each color of light may be in a range from 24 nm to 50 nm inclusive. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 4 nm to 23 nm exclusive. Each color of light emitted by the light source includes a small amount of light having a wavelength shifted from a peak wavelength in the emission spectrum (hereinafter referred to as side lobe light). The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 20% to 50% exclusive. The observer can observe the virtual image formed form the reflected light from the wavelength selective reflecting member with sufficiently high brightness. Furthermore, because a large amount of ambient light transmitting through the wavelength selective reflecting member is obtained, the observer can further properly observe the external image formed from the ambient light. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 10% to 25% exclusive. Therefore, a wide viewing angle is provided for the observer who observes the virtual image.

(8) The reflective projection display device may include a light source for supplying the red light, the green light, and the blue light. A full width at half maximum in an emission spectrum of each color of light may be in a range from 24 nm to 50 nm inclusive. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 23 nm to 71 nm exclusive. Each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 50% to 80% exclusive, which is sufficiently high. The observer can observe the virtual image formed form the reflected light from the wavelength selective reflecting member with higher brightness. Furthermore, because a sufficient amount of ambient light transmitting through the wavelength selective reflecting member is obtained, the observer can properly observe the external image formed from the ambient light. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 25% to 40% exclusive. Therefore, a wide viewing angle is provided for the observer who observes the virtual image.

(9) The reflective projection display device may include a light source for supplying the red light, the green light, and the blue light. A full width at half maximum in an emission spectrum of each color of light may be in a range from 24 nm to 50 nm inclusive. A full width at half maximum in a reflectance spectrum of the red light reflecting portion, a full width at half maximum in a reflectance spectrum of the green light reflecting portion, and a full width at half maximum in a reflectance spectrum of the blue light reflecting portion may be in a range from 71 nm to 90 nm inclusive. Each color of light emitted by the light source includes a small amount of side lobe light having a wavelength shifted from a peak wavelength in the emission spectrum. The larger the full width at half maximum in the reflectance spectrum of each of the light reflecting portions, the larger the amount of side lobe light reflected. By setting the full width at half maximum of the reflectance spectrum of each of the reflecting portions as described above, each color of light emitted by the light source can be reflected by the corresponding light reflecting portion of the wavelength selective reflecting member with the reflectivity in a range from 80% to 83% inclusive, which is higher. The observer can observe the virtual image formed form the reflected light from the wavelength selective reflecting member with higher brightness. Even if the wavelength shift occurs in the reflected light due to the variation in incident angle of light entering each of the light reflecting portions, each color of light emitted by the light source can be reflected by the corresponding light reflecting portion of the wavelength selective reflecting member with the reflectivity in a range from 40% to 83% inclusive. Therefore, when the full width at half maximum in the reflectance spectrum of each of the light reflecting portions is maintained equal to or less than 90 nm, the ambient light transmissivity of 70% or higher is achieved and thus the Japanese safety regulations for road vehicles is satisfied.

(10) The red light reflecting portion, the green light reflecting portion, and the blue light reflecting portion of the wavelength selective reflecting member may include cholesteric liquid crystal panels. The full width at half maximum in the reflectance spectrum of cholesteric liquid crystals can be easily adjusted at low cost by changing liquid crystal materials. Therefore, the reflectance spectrum with a specific full width at half maximum can be easily produced at low cost. Furthermore, according to the configuration, the wavelength selective reflecting member has polarized light selectivity.

(11) The blue light reflecting portion of the wavelength selective reflecting member may be arranged the farthest from the display component. If the red light reflecting portion is arranged the farthest from the display component, to adjust the white balance, the brightness of light in the red wavelength region included in the light from the display component may be set the highest while the brightness of light in the green wavelength region and the brightness of light in the blue wavelength region may be set lower than the highest brightness. As described above, with the blue light reflecting portion arranged the farthest from the display component, the light from the display component includes light in the green wavelength region with the highest brightness and light in the red wavelength region and in the blue wavelength region with the brightness lower than the highest brightness. Namely, the brightness of the light in the green wavelength region is relatively high. Furthermore, a larger amount of light in the red wavelength region reflected by the red light reflecting portion is obtained. According to the configuration, the largest amount of light used for displaying images is obtained.

(12) The reflective projection display device may include a polarized light converter for selectively converting light into left circularly converted light or right circularly converted light. The polarized light converter may be arranged on a display component side relative to at least the wavelength selective reflecting member. Each of the red light reflecting portion, the green light reflecting portion, and the blue light reflecting portion of the wavelength selective reflecting member may have polarized light selectivity in addition to the wavelength selectivity. Each of the red light reflecting portion, the green light reflecting portion, and the blue light reflecting portion of the wavelength selective reflecting member may have polarization property corresponding with polarization properly of the polarized light converter. According to the configuration, the light selectively converted into the left circularly polarized light or the right circularly polarized light is reflected by the red light reflecting portion, the green light reflecting portion, and the blue light reflecting portion having polarization property the same as that of the polarized light converter and observed by the observer as a virtual image. If the polarized light converter is omitted and the wavelength selective reflecting member does not have the polarized light selectivity, the reflected light is more likely to be tinted. In comparison to such a configuration, the reflected light is less likely to be tinted according to the configuration described above. If the reflectance spectra of the light reflecting portions overlap one another, rays of the red light and the blue light having wavelengths in the reflectance spectrum of the green light reflecting portion are reflected by the green light reflecting portion. If the red light reflecting portion or the blue light reflecting portion has polarization property different from that of the green light reflecting portion, rays of the red light or the blue light having wavelengths in the reflectance spectrum of the green light reflecting portion are not reflected by the green light reflecting portion. In comparison to that, the amount of light used for displaying images further increases.

Advantageous Effect of the Invention

According to the present invention, the amount of light for displaying images can be increased.

BRIEF DESCRIPTION OF THE DRAWINGS

FIG. 5 is a table illustrating optical characteristics of the laser diode components included in the laser diode, luminous fluxes to achieve target white balance, luminous fluxes of exiting light with white balance adjusted based on green light, and absorption rates to absorb corresponding colors of light by light reflecting portions of the combiner.

FIG. 7 is a table illustrating experimental results of comparative experiment 1 regarding comparative examples 1 to 4.

FIG. 8 is a table illustrating experimental results of comparative experiment 1 regarding examples 1 and 2.

FIG. 12 is a table illustrating optical characteristics of the LED components included in the LED, luminous fluxes to achieve target white balance, luminous fluxes of exiting light with white balance adjusted based on green light, and absorption rates to absorb corresponding colors of light by light reflecting portions.

FIG. 13 is a table illustrating results of comparative experiment 3 regarding comparative examples 5 to 8.

FIG. 14 is a table illustrating results of comparative experiment 3 regarding examples 3 to 4.

MODE FOR CARRYING OUT THE INVENTION

First Embodiment

A first embodiment will be described with reference to FIGS. 1 to 9. In this section, a head-up display (a reflective projection display device) 10 installed in a vehicle will be described. The head-up display 10 is for displaying virtual images VI in a front field of view of a driver in front of a front windshield 1 during driving. The virtual images VI include various pieces of information including a driving speed, various warnings, and geographic information. With the head-up display 10, eye movement of the driver during driving can be reduced. In the following description, visible light will be simply referred to as "light."

Figure 1:
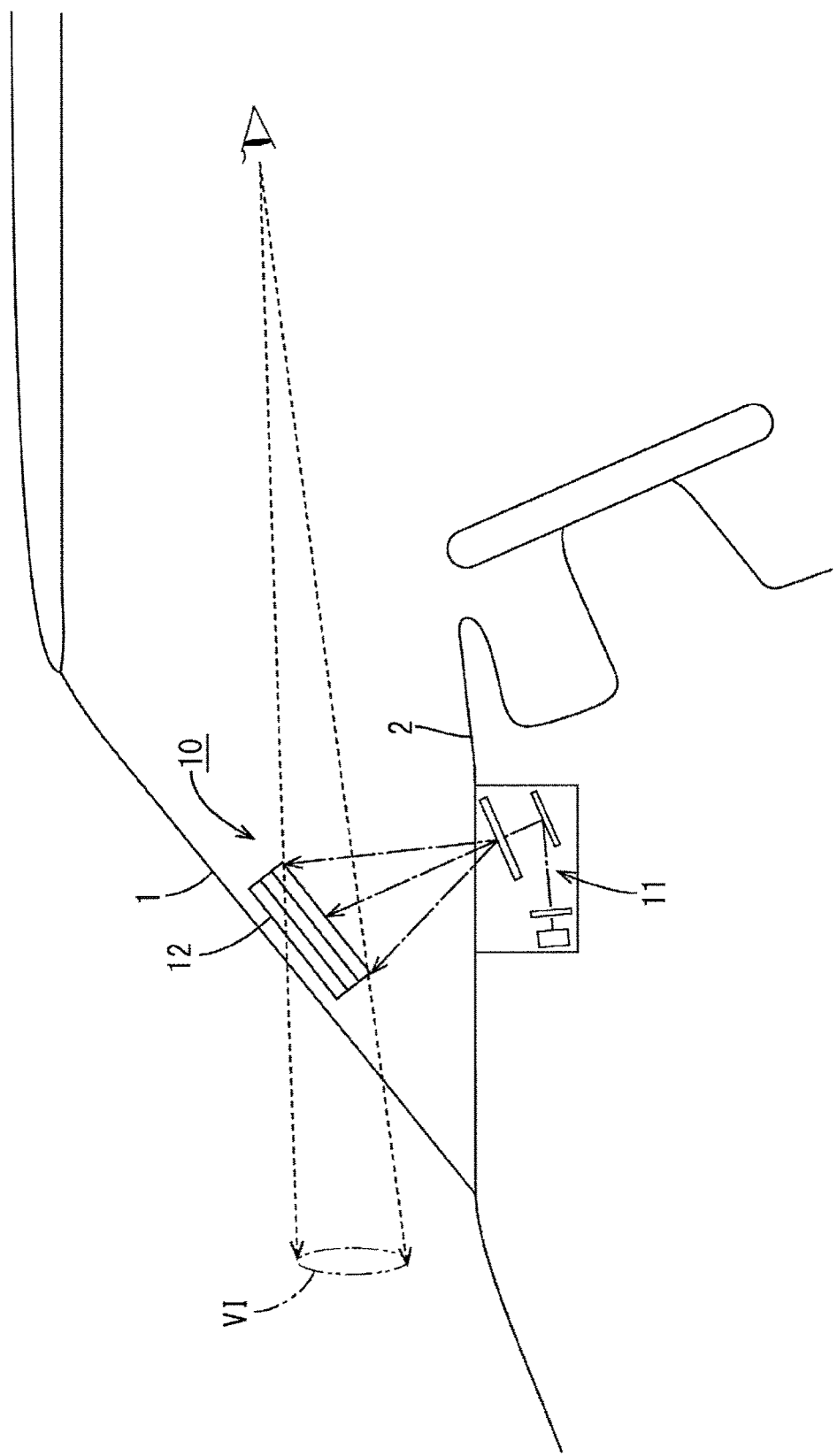
FIG. 1 is a side view illustrating a schematic configuration of a head-up display installed in a vehicle according to an embodiment of the present invention.

As illustrated in FIG. 1, the head-up display 10 includes a display component unit 11 and a combiner (a wavelength selective reflecting member) 12. The display component unit 11 is held in a dashboard 2 and configured to display images. The combiner 12 is disposed opposite a front windshield 1 and configured to reflect light from the display component unit 11 such that the driver or an observer observes the reflected light as an virtual image VI. The display component unit 11 includes a laser diode (a light source) 13, a MEMS mirror component (a display component) 14, and a screen 15. The MEMS mirror component 14 is for displaying images using light from the laser diode 13. The images displayed on the MEMS mirror component 14 are projected on the screen 15 as enlarged images. The "MEMS" stands for micro electro mechanical systems.

Figure 3:
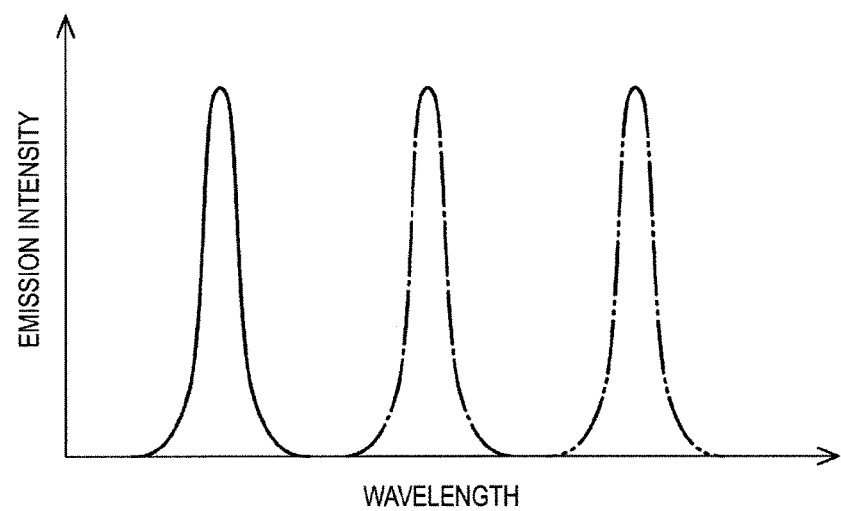
FIG. 3 is a graph illustrating emission spectra of corresponding colors of laser diode components included in a laser diode.

The laser diode 13 includes a red laser diode component, a green laser diode component, and a blue laser diode component. The red laser diode component emits red light having a wavelength in a red wavelength range (about 600 nm to about 780 nm). The green laser diode component emits green light having a wavelength in a green wavelength range (about 500 nm to about 570 nm). The blue laser diode component emits blue light having a wavelength in a blue wavelength range (about 420 nm to about 500 nm). The laser diode components included in the laser diode 13 include built-in resonators, respectively. Each of the resonators is configured to produce resonance through multiple reflection of the light. Therefore, the laser diode components emit beams of light with the same wavelength and phase. Namely, exiting light is formed from coherent and linearly polarized beams. The laser diode 13 is configured such that a full width at half maximum in the light emission spectrum of each color of emitting light is equal to or less than 1 nm. As illustrated in FIG. 3, a full width at half maximum in an emission spectrum of light emitted by the red laser diode component included in the laser diode 13 is about 638 nm. A full width at half maximum in an emission spectrum of light emitted by the green laser diode component is about 516 nm. A full width at half maximum in an emission spectrum of light emitted by the blue laser diode component is about 450 nm. The laser diode components, which are light sources, are not illustrated in the drawings.

The laser diode 13 emits red light, green light, and blue light in a predetermined sequence at predetermined timing. Intensities of the colors of light emitted by the laser diode 13 are adjusted to form images from the red light, the green light, and the blue light with a specified level of white balance. The white balance is adjusted by setting ratios of output values (currents) of the red laser diode component, the green laser diode component, and the blue laser diode component in the laser diode 13. The laser diode 13 is adjusted for forming an image with white balance achieved by setting a luminous flux of the red light to about 26%, a luminous flux of the green light to about 72%, and a luminous flux of the blue light to about 2% as illustrated in FIG. 5 (see the third row from the bottom in FIG. 5). The red laser diode component, the green laser diode component, and the blue laser diode component of the laser diode 13 have emission characteristics with the maximum luminous flux (in unit of "a.u.") of red light of about 37.5, the maximum luminous flux of green light of about 50, and the maximum luminous flux of blue light of about 4 (see the top row in FIG. 5). The maximum luminous fluxes are luminous fluxes that are obtained when the maximum rated currents are supplied to the respective colors of the laser diode components, respectively. Each of the maximum luminous fluxes is calculated by multiplying the emission intensity by relative luminous efficiency. The relative luminous efficiency of the red light is 0.25. The relative luminous efficiency of the green light is 1.0. The relative luminous efficiency of the blue light is 0.05. If the green light is emitted by the green laser diode component of the laser diode 13 with the maximum luminous flux (about 50), to maintain the target white balance, outputs of the red laser diode and the blue laser diode are adjusted such that the luminous flux of the red light is about 18.2 (in unit of "a.u.") and the luminous flux of the blue light is about 1.4 (see the second row from the bottom in FIG. 5).

The MEMS mirror component 14 includes a single mirror and a driver for driving the mirror on a circuit board fabricated with a MEMS technology. The mirror has a round shape with a diameter of some tenth of a millimeter to some millimeters. The mirror includes a mirror surface that is a reflecting surface configured to reflect light from the laser diode 13. The driver includes two shafts that are perpendicular to each other. The shafts hold the mirror and freely angle the mirror using electromagnetic forces or static forces. The MEMS mirror component 14 is configured to direct light to a screen to two-dimensionally scan the screen with the light by controlling tilting movement of the mirror with the driver and thus two-dimensional images are projected on the screen. The screen 15 on which the light directed by the MEMS mirror component 14 is projected directs the projected light to the combiner 12, which will be described next.

Figure 4:
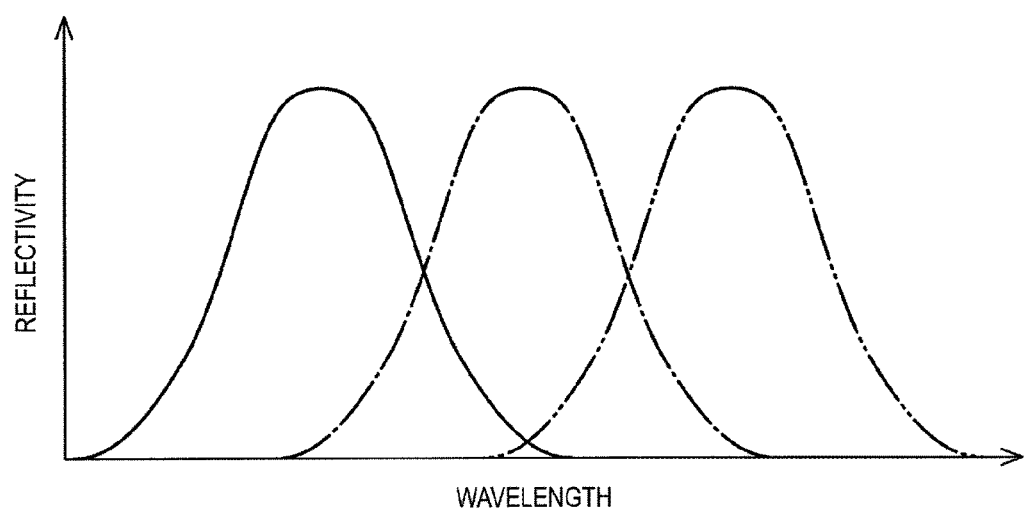
FIG. 4 is a graph illustrating reflection spectra of light reflecting portions included in a combiner.
Figure 6:
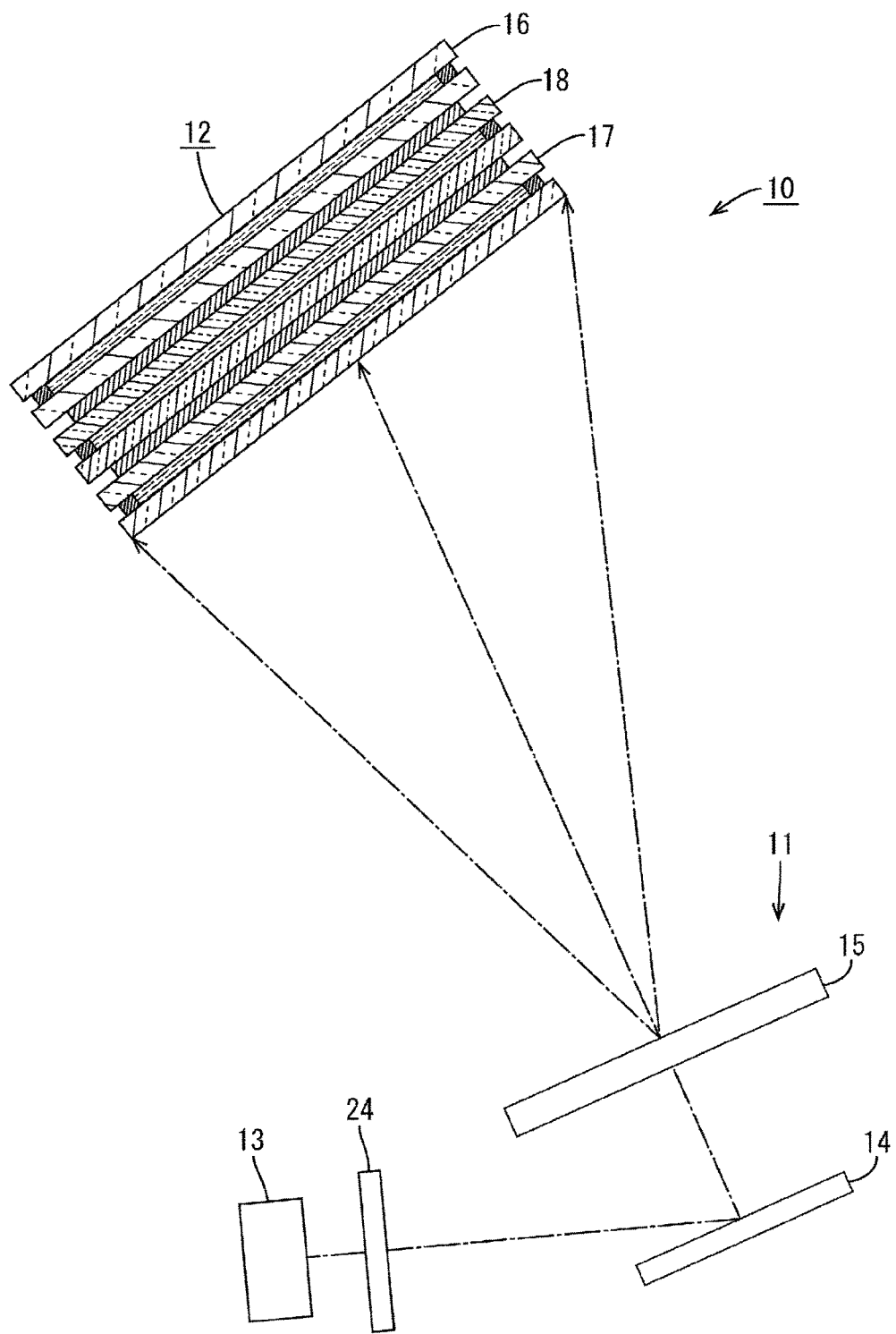
FIG. 6 is a cross-sectional view of a combiner according to example 2 in comparative experiment 1.

As illustrated in FIG. 1, the combiner 12 is disposed slightly away from an inner surface of the front windshield 1. The combiner 12 may be attached to a holding part or a sun visor (not illustrated) and held at the position. The combiner 12 includes a red light reflecting portion 16, a green light reflecting portion 17, and a blue light reflecting portion 18 that are laid in layers. The red light reflecting portion 16 selectively reflects mainly red light. The green light reflecting portion 17 selectively reflects mainly green light. The blue light reflecting portion 18 selectively reflects mainly blue light. The restrictive colors of light reflecting portions 16 to 18 laid in layers are bonded together with bonding layers 19 that are adhesives formed between the layers. The combiner 12 is a reflecting member having wavelength sensitivity. The combiner 12 passes rays of ambient light that are not in reflectance spectra of the light reflecting portions 16 to 18. Rays of light reflected by the light reflecting portions 16 to 18 reach eyes of the observer, that is, the observer observes the vertical image VI formed from the rays of reflected light with high brightness. Furthermore, the observer properly observes images formed from the rays of ambient light transmitted through the combiner 12 with high transmissivity in front of the front windshield 1. As illustrated in FIG. 4, the red light reflecting portion 16 of the combiner 12 is configured such that a peak wavelength at a peak in the reflectance spectrum is about 638 nm. The green light reflecting portion 17 of the combiner 12 is configured such that a peak wavelength at a peak in the reflectance spectrum is about 516 nm. The blue light reflecting portion 18 of the combiner 12 is configured such that a peak wavelength at a peak in the reflectance spectrum is about 450 nm. The combiner 12 has at least 70% of transmissivity to transmit ambient light (external visible light) and this satisfies the Japanese safety regulations for road vehicles.

Figure 2:
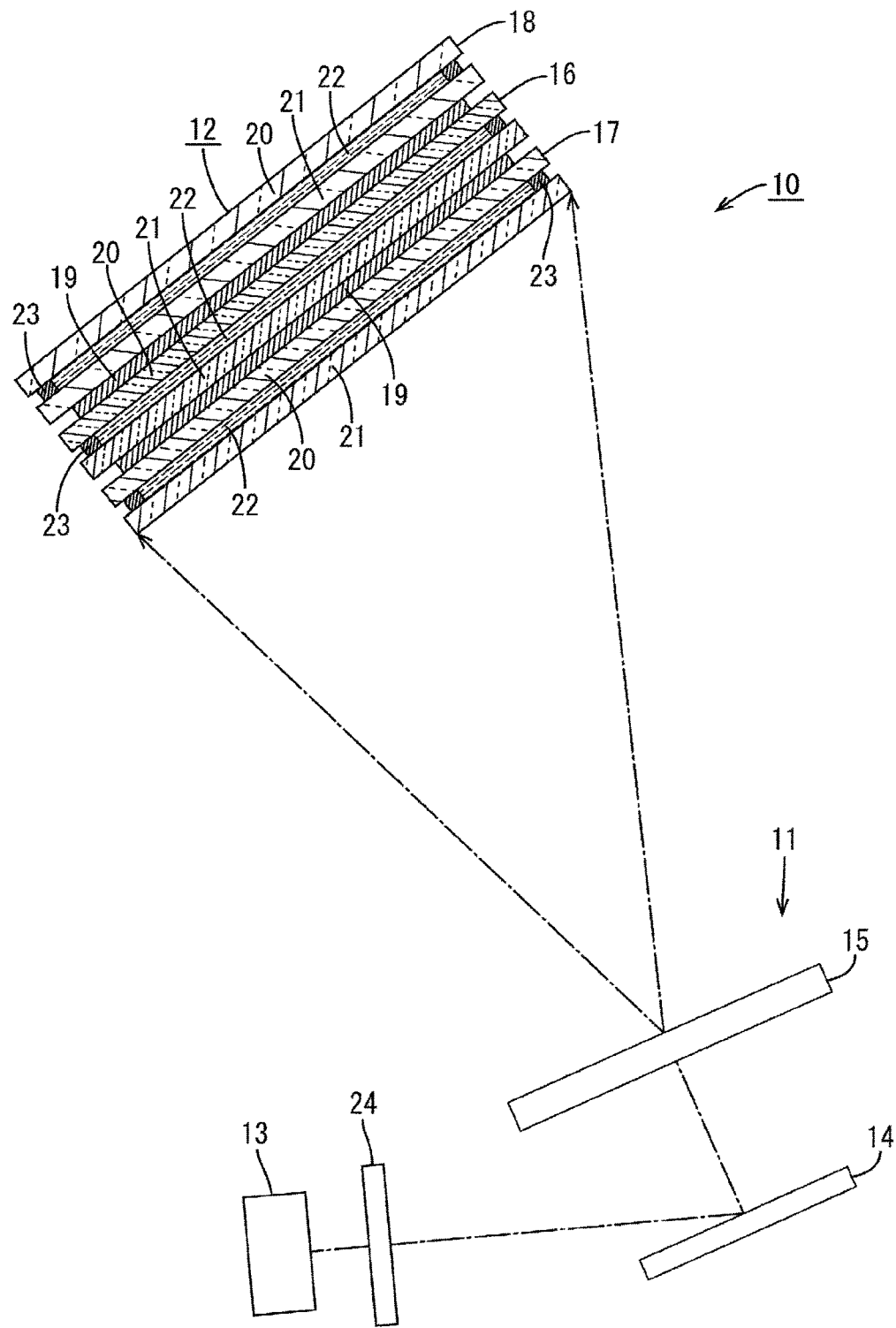
FIG. 2 is a cross-sectional view of the head-up display.

The respective colors of the light reflecting portions 16 to 18 included in the combiner 12 include cholesteric liquid crystal panels, respectively. As illustrated in FIG. 2, each cholesteric liquid crystal panel includes a pair of substantially transparent substrates 20 and 21, a cholesteric liquid crystal layer 22, and a sealing portion 23. The cholesteric liquid crystal layer 22 is sandwiched between the substrates 20 and 21. The sealing portion 23 seals the cholesteric liquid crystal layer 22. The cholesteric liquid crystal layers 22 have helical periodic structures in which liquid crystal molecules are helically arranged with specified pitches. The cholesteric liquid crystal layers 22 selectively reflect rays of light having specific wavelengths according to the helical pitches. Each of the cholesteric liquid crystal layers 22 includes nematic liquid crystals with a chiral material added thereto to form the helical structure. The helical pitch, that is, the wavelength of light to be selectively reflected (a peak wavelength at a peak in the reflectance spectrum), can be adjusted where appropriate. To adjust the full width at half maximum in the reflectance spectrum of each color of light reflected by corresponding one of the light reflecting portions 16 to 18, the helical pitch of the liquid crystal molecules in the cholesteric liquid crystal layer 22 or a content ratio of liquid crystal molecules having different helical pitches may be adjusted. The cholesteric liquid crystal layers 22 reflect circularly polarized light, a helical direction of which corresponds with a helical direction of the helically arranged liquid crystal molecules, that is, one of right circularly polarized light and left circularly polarized light. Namely, the cholesteric liquid crystal layers 22 have polarized light selectivity. Furthermore, the cholesteric liquid crystal layers 22 selectively reflect rays of light with incident angles in a specified range. Namely, the cholesteric liquid crystal layers 22 have incident angle sensitivity.

As described earlier, the light reflecting portions 16 to 18 included in the combiner 12 have the wavelength selectivity. Therefore, light that is not in the reflectance spectrum passes the light reflecting portions 16 to 18. A certain percentage of the light is absorbed when the light passes the light reflecting portions 16 to 18. Light absorption rates of the light reflecting portions 16 to 18 are different from one another depending on the wavelengths of light. The light absorption rates tend to be higher on a short wavelength side and lower on a long wavelength side. Specifically, as illustrated in FIG. 5, the light absorption rates of the light reflecting portions 16 to 18 are about 20% for the red light, about 25% for the green light, and about 30% for the blue light (see the bottom row in FIG. 5).

In general, an emission intensity regarding ambient light used for displaying images by a reflective projection liquid crystal display device does not have wavelength dependency. Therefore, in the reflective projection liquid crystal display device, a blue liquid crystal layer that reflects blue light that is most likely to be absorbed may be arranged the closest to the component observing side. According to the configuration, the blue light is less likely to be absorbed by a green liquid crystal layer or a red liquid crystal layer. As a result, the amount of light used for displaying images increases. However, the head-up display 10 according to this embodiment includes the laser diode 13 as a light source. The laser diode 13 has a specific light emission spectrum. If a color cholesteric liquid crystal display component disposed similarly to the one in the above-described reflective projection liquid crystal display device is used as a combiner in the head-up display 10, an amount of light used for displaying images may decrease. Specifically, the emission intensity of the laser diode 13 to emit light toward the MEMS mirror component 14 has wavelength dependency. To maintain white balance of a displayed image, the green light may be included in the light with the highest percentage. The absorption of light by the light reflecting portions 16 to 18 included in the combiner 12 has wavelength dependency. Furthermore, the light reflected by one of the light reflecting portions 16 to 18 farther from the MEMS mirror component 14 is absorbed by one of the light reflecting portions 16 to 18 closer to the MEMS mirror component 14. Therefore, the amount of light tends to decrease. For those reasons, if the color cholesteric liquid crystal display component in the above reflective projection liquid crystal display device is used as a combiner, the amount of green light especially decreases and thus brightness of displayed images may decrease.

In the combiner 12 according to this embodiment, the green light reflecting portion 17 is arranged the closest to the MEMS mirror component 14 (the laser diode 13) and the observer regarding the sequence of the light reflecting portions 16 to 18 in which they are laid in layers. According to the configuration, the green light included in the light emitted by the laser diode 13 with the highest percentage to maintain the white balance of the display images is effectively reflected by the green light reflecting portion 17 arranged the closest to the MEMS mirror component 14 and the observer. Namely, the green light, the amount of which is the highest, is less likely to be absorbed by the red light reflecting portion 16 and the blue light reflecting portion 18 that are arranged farther from the MEMS mirror component 14 and the observer than the green light reflecting portion 17. According to the configuration, the white balance is properly maintained and the amount of light used for displaying images increases. Furthermore, in comparison to the red light and the blue light, the green light has a higher relative luminous efficiency. With the amount of light increased as described above, the brightness improves.

The head-up display 10 further includes a polarized light converter 24 disposed between the laser diode 13 and the MEMS mirror component 14. The polarized light converter 24 is for selectively converting the light from the laser diode into right circularly polarized light or left circularly polarized light. The polarized light converter 24 includes a retarder (a quarter-wave retarder) configured to produce a ¼λ phase difference. Linearly polarized light emitted by the laser diode 13 is converted into any one of the right circularly polarized light and the left circularly polarized light. In addition to that, the light reflecting portions 16 to 18 included in the combiner 12 are configured such that polarization properties thereof correspond with one another and with the polarization property of the polarized light converter 24. If the polarized light converter 24 is configured to have the polarization property to selectively converting the linearly polarized light into the right circularly polarized light, the light reflecting portions 16 to 18 have the polarization properties to selectively reflect only the right circularly polarized light. If the polarized light converter 24 is configured to have the polarization property to selectively converting the linearly polarized light into the left circularly polarized light, the light reflecting portions 16 to 18 have the polarization properties to selectively reflect only the left circularly polarized light. According to the configuration, the light selectively converted into the right circularly polarized light or the left circularly polarized light by the polarized light converter 24 is reflected by the red light reflecting portion 16, the green light reflecting portion 17, and the blue light reflecting portion 18 having the polarization properties corresponding with the polarization properly of the polarized light converter 24. The reflected light is observed as a virtual image VI by the observer. If the polarized light converter is omitted and the combiner does not have the polarized light selectivity, transmitted light or reflected light of the ambient light is more likely to be tinted. If the reflectance spectra of the light reflecting portions 16 to 18 overlap one another (see FIG. 4), the red light or the blue light, whichever the wavelength thereof is in the reflectance spectrum of the green light reflecting portion 17, is reflected by the green light reflecting portion 17 according to the above configuration. If the red light reflecting portion or the blue light reflecting portion is configured to have the polarization property different from the polarization property of the green light reflecting portion 17, the red light or the blue light, whichever the wavelength thereof is the in the reflectance spectrum of the green light reflecting portion 17, is not reflected by the green light reflecting portion 17. In comparison to the configuration, the amount of light used for displaying images further increases.

In the combiner 12, the blue light reflecting portion 18 is arranged the farthest from the MEMS mirror component 14 and the observer in the sequence in which the light reflecting portions 16 to 18 are laid in layers. Namely, the light reflecting portions 16 to 18 included in the combiner 12 are arranged in layers such that the green light reflecting portion 17, the red light reflecting portion 16, and the blue light reflecting portion 18 are arranged in this sequence from the side close to the MEMS mirror component 14 and the observer. The red light reflecting portion 16 is sandwiched between the green light reflecting portion 17 that is the closest to the MEMS mirror component 14 and the observer and the blue light reflecting portion 18 that is the farthest from the MEMS mirror component 14 and the observer.

Next, the following comparative experiment 1 was conducted to obtain an idea on how a luminous flux of light exiting from the combiner 12, that is, the brightness changes according to alteration of the sequence of the light reflecting portions 16 to 18 included in the combiner 12 in which they are laid in layers. In comparative experiment 1, the following examples are used. The light reflecting portions 16 to 18 included in the combiner 12 are arranged differently from one example to another with regard to the sequence in which they are laid in layers. The sequence of the light reflecting portions 16 to 18 in each example starts from the side closer to the MEMS mirror component 14 and the observer. In comparative example 1, the red light reflecting portion 16, the green light reflecting portion 17, and the blue light reflecting portion 18 in this sequence. In comparative example 2, the red light reflecting portion 16, the blue light reflecting portion 18, and the green light reflecting portion 17 in this sequence. In comparative example 3, the blue light reflecting portion 18, the red light reflecting portion 16, and the green light reflecting portion 17 in this sequence. In comparative example 4, the blue light reflecting portion 18, the green light reflecting portion 17, and the red light reflecting portion 16 in this sequence. In example 1, the green light reflecting portion 17, the red light reflecting portion 16, and the blue light reflecting portion 18 in this sequence. In example 2, the green light reflecting portion 17, the blue light reflecting portion 18, and the red light reflecting portion 16 in this sequence. The combiner 12 according to example 2 has a cross-sectional configuration illustrated in FIG. 6. The laser diode 13 is configured to supply light to the combiner 12 in each of comparative examples 1 to 4 and examples 1 and 2 via the MEMS mirror component 14 and the screen 15. Luminous fluxes of colors of light emitted by the laser diode 13 are adjusted to obtain white balance with a target luminous flux ratio regarding an image formed from the reflected light from the combiner 12. In the adjustment, the luminous flux of one of the red light, the green light, and the blue light emitted by the laser diode 13 is set to the maximum. The light emitted by the laser diode 13 adjusted as described above is reflected by the combiner 12 in each of comparative examples 1 to 4 and examples 1 and 2. The luminous fluxes regarding the emitting light obtained through the reflection were measured and the results are presented in FIGS. 7 and 8. In FIGS. 7 and 8, alphabets are present in parenthesises in cells of comparative examples 1 to 4 and examples 1 and 2. The alphabets are initials of the light reflecting portions 16 to 18 indicating a layering sequence from the side close to the MEMS mirror 14 and the screen 15.

In FIGS. 7 and 8, "LUMINOUS FLUX OF INCIDENT LIGHT TO OBTAIN EXITING LIGHT WITH ADJUSTED WHITE BALANCE" in the top row indicates a luminous flux of incident light 12L_in (in unit of "a.u.") to each combiner 12 required to obtain exiting light 12L_out with adjusted white balance from the combiner 12 (see the second row from the bottom in FIG. 5). The white balance is adjusted with the maximum luminous flux of green light included in light emitted by the laser diode 13 as a reference. Luminous fluxes of the red light, the green light, and the blue light included in the incident light 12L_in are calculated based on assumption that the luminous flux of the green light in the exiting light 12L_out from the combiner 12 with the adjusted white balance is equal to the maximum luminous flux of the green light included in the light emitted by the laser diode 13. Specifically, the incident light 12L_in is calculated from the following equation (1). In equation (1), "R1" is reflectivity of one of the light reflecting portions 16 to 18 included in the combiner 12 in the first layer from the side close to the MEMS mirror component 14 and the observer. "R2" is reflectivity of the light reflecting portion in the second layer. "R3" is reflectively of the light reflecting portion in the third layer (the farthest to the MEMS mirror component 14 and the observer. Regarding specific values of "R1 to R3," the reflectivity of the light reflecting portions 16 to 18 to reflect light having a wavelength that corresponds with a peak wavelength of a reflectance spectrum is set to 90% and the reflectivity of the light reflecting portions 16 to 18 to reflect light having a wavelength that does not correspond with the peak wavelength of the reflectance spectrum is set to 10%. The reason why the reflectivity of the light reflecting portions 16 to 18 to reflect light having a wavelength that does not correspond with the peak wavelength of the reflectance spectrum is set to 10% is that side lobe light may be included in the above reflectance spectrum even if the wavelength that does not correspond with the peak wavelength of the reflectance spectrum. In equation (1), "A1" is a light absorption coefficient of the light reflecting portion in the first layer from the side close to the MEMS mirror component 14 and the observer. "A2" is a light absorption coefficient of the light reflecting portion in the second layer. In the combiner 12, light having a wavelength that corresponds with the peak wavelength of the reflectance spectrum of the light reflecting portion in the second layer passes the light reflecting portion in the first layer and is absorbed by the light reflecting portion in the first layer at entry and exit. In the combiner 12, light having a wavelength that corresponds with the peak wavelength of the reflectance spectrum of the light reflecting portion in the third layer passes the light reflecting portion in the first layer and the light reflecting portion in the second layer and is absorbed by the light reflecting portion in the first layer and the light reflecting portion in the second layer at entry and exit.

Equation 1

$$12L\_in = 12L\_out/(R1 + R2*(1-R1)*(1-A1)^2 + R3*(1-R1)*(1-A1)^2*(1-R2)*(1-A2)^2) \quad (1)$$

In FIGS. 7 and 8, values in the second row from the top "MAXIMUM RATED LUMINOUS FLUX OF THE INCIDENT LIGHT" are maximum rated values obtained by calculating maximum values from values obtained by dividing the incident light 12L_in of the respective colors in the top row by maximum luminous fluxes of the respective colors of light from the laser diode 13 (see the top row in FIG. 5) and by dividing the respective colors of the incident light 12L_in by the maximum values. If the incident light 12L_in of any one of colors is assumed to be the maximum luminous flux of the laser diode 13, luminous fluxes regarding other two colors to achieve target white balance of the exiting light 12L_out are calculated. The luminous fluxes of the other two colors are smaller than the maximum luminous fluxes.

In FIGS. 7 and 8, luminous fluxes in the second row from the bottom "LUMINOUS FLUX OF EACH COLOR OF EXITING LIGHT" are calculated by multiplying values in the "MAXIMUM RATED LUMINOUS FLUX OF THE INCIDENT LIGHT" row by valued in the "LUMINOUS FLUX OF EXITING LIGHT WITH WHITE BALANCE ADJUSTED BASED ON GREEN LIGHT" row (see the second row from the bottom in FIG. 5) and dividing the results of the multiplication by values in the "LUMINOUS FLUX OF INCIDENT LIGHT TO OBTAIN EXITING LIGHT WITH ADJUSTED WHITE BALANCE" row. Namely, each exiting light 12L_out is calculated as "LUMINOUS FLUX OF EACH COLOR OF EXITING LIGHT," where the incident light 12L_in is considered as "MAXIMUM RATED LUMINOUS FLUX OF THE INCIDENT LIGHT." In FIGS. 7 and 8, values in the bottom row "LUMINOUS FLUX OF ENTIRE EXITING LIGHT" are sums of values in the "LUMINOUS FLUX OF EACH COLOR OF EXITING LIGHT" row. "LUMINOUS FLUX OF ENTER EXITING LIGHT" expresses brightness of displayed image using reflected light from the combiner 12.

The results of comparative experiment 1 will be described. According to FIGS. 7 and 8, values in the "LUMINOUS FLUX OF ENTER EXITING LIGHT" row regarding examples 1 and 2 are the highest, the values regarding comparative examples 1 and 4 are the second highest, and the values regarding comparative examples 2 and 3 are the lowest. In each of examples 1 and 2, the green light reflecting portion 17 is arranged in the first layer. In each of comparative examples 1 and 4, the green light reflecting portion 17 is arranged in the second layer. In each of comparative examples 2 and 3, the green light reflecting portion 17 is in the third layer. Namely, "LUMINOUS FLUX OF ENTIRE EXITING LIGHT" depends on the arrangement of the green light reflecting portion 17 in the combiner 12. The closer the green light reflecting portion 17 to the MEMS mirror component 14 and the observer, the higher the luminous flux. The farther the green light reflecting portion 17 from the MEMS mirror component 14 and the observer, the lower the luminous flux. Specifically, the green light reflecting portion 17 is arranged in the second layer in each of comparative example 1 and 4 and thus the green light included in the incident light 12L_in with the highest percentage to achieve the target white balance is absorbed by the light reflecting portion in the first layer in a light path. In comparison to examples 1 and 2, the amount of the green light decreases. The green light reflecting portion 17 is arranged in the third layer in each of comparative examples 2 and 3 and thus the green light included in the incident light 12L_in with the highest percentage to achieve the target white balance is absorbed by the light reflecting portion in the first layer and the light reflecting portion in the second layer. In comparison to examples 1 and 2 and comparative examples 1 and 4, the amount of green light decreases. The green light reflecting portion 17 is arranged in the first layer in each of examples 1 and 2 and thus the green light included in the incident light 12L_in with the highest percentage to achieve the target white balance is effectively reflected by the green light reflecting portion 17 before absorbed by other light reflecting portions. According to the configuration, the amount of green light is the largest in each of examples 1 and 2. Therefore, the luminous flux of enter exiting light is the highest in each of examples 1 and 2.

Figure 9:
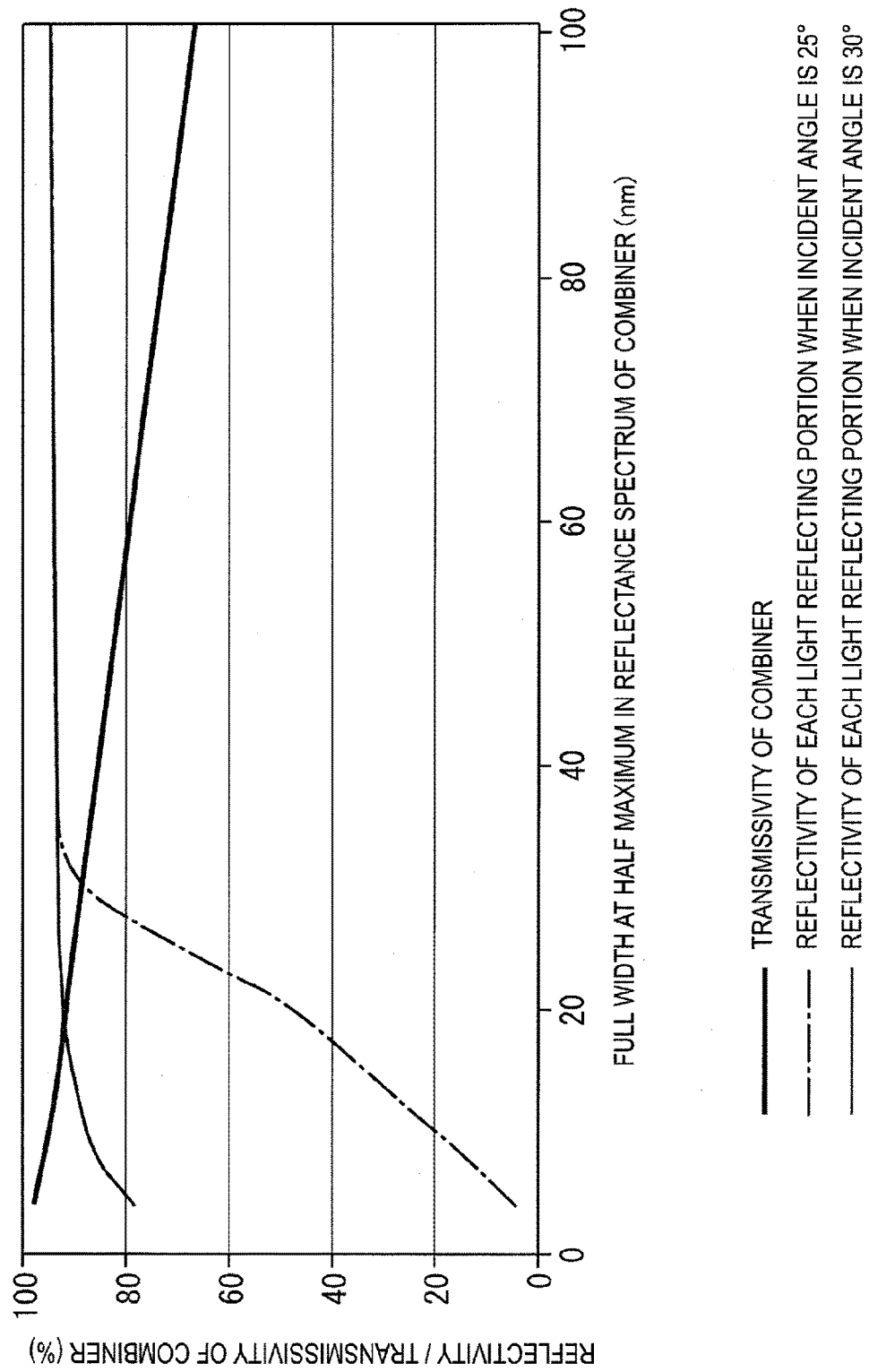
FIG. 9 is a graph illustrating relationships between a full width at half maximum in a reflectance spectrum of the combiner and reflectivity of the combiner and between the full width at half maximum and transmissivity of the combiner according to results of comparative experiment 2.

The following comparative experiment 2 was conducted to obtain an idea how the full width at half maximum of each of the light reflecting portions 16 to 18 in the reflectance spectrum and the transmissivity of the combiner 12 relate to each other and the full width at half maximum of each of the light reflecting portions 16 to 18 in the reflectance spectrum and the reflectivity of each of the light reflecting portions 16 to 18 to reflect a corresponding color of light relate to each other. In comparative experiment 2, the combiner 12 used in comparative experiment 2 has the same configuration with that of example 1 used in comparative example 1. The visible light transmissivity of the combiner 12 and the reflectivity of each of the light reflecting portions 16 to 18 to reflect light having a wavelength that corresponds with the peak wavelength in the reflectance spectrum were measured while the full width at half maximum in the reflectance spectrum of each of the light reflecting portions 16 to 18 included in the combiner 12 was varied within a range from 4 nm to 100 nm to observe how the transmissivity and the reflectivity vary according to the variation in the full width at half maximum. The results are presented in FIG. 9. In FIG. 9, the horizontal axis indicates the full width at half maximum in the reflectance spectrum of each of the light reflecting portions 16 to 18 included in the combiner 12 (in unit of "nm"). The vertical axis indicated the visible light transmissivity of the combiner 12 (in unit of "%") and the reflectivity of each of the light reflecting portions 16 to 18 to reflect light having a wavelength that corresponds with the peak wavelength in the reflectance spectrum (in unit of "%"). In comparative experiment 2, the reflectivity when an incident angle of the incident light 12L_in to the combiner 12 is 25 degrees and the reflectivity when the incident angle is 30 degrees. The incident angle of the incident light 12L_in indicates a position at which the incident light 12L_in enters the combiner 12 when a position of the display component unit 11 relative to the combiner 12 is constant. In comparative experiment 2, the results indicate that the incident light 12L_in enter the combiner 12 at the middle of the combiner 12 when the incident angle is 25 degrees and at one of ends of the combiner 12 when the incident angle is 30 degrees. Namely, comparative experiment 2 was conducted to examine how the reflectivity varies between when the light enters the combiner 12 at the middle and when the light enters the combiner 12 at the end. The transmissivity of the combiner 12 does not have dependency on the incident angle of the incident light 12L_in. When light enters the combiner 12 at the other end, the incident angle of the incident light 12L_in to the combiner 12 is 20 degrees. The result of the above case is similar to the result when the incident angle is 30 degrees.

The results of comparative experiment 2 will be described. According to FIG. 9, in the combiner 12, the smaller the full width at half maximum in the reflectance spectrum of each of the light reflecting portions 16 to 18, the higher the transmissivity, that is, the larger the amount of transmitted ambient light. However, the amount of reflected light for displaying images decreases and thus the brightness of the displayed images tends to decrease. The larger the full width at half maximum in the reflectance spectrum of each of the light reflecting portions 16 to 18, the larger the amount of reflected light for displaying images. However, the amount of transmitted ambient light decreases and thus external images tend to become difficult to be viewed. The larger the full width at half maximum in the reflectance spectrum of each of the light reflecting portions 16 to 18, the larger the amount of reflected light for displaying images.

This may be because the efficiency in use of side lobe light included in the light emitted by the laser diode 13 is improved.

In comparison between the condition in which the incident angle of the incident light 12L_in to the combiner 12 is 25 degrees and the condition in which the incident angle is 30 degrees, the reflectivity in the former condition is constantly higher than the reflectivity in the latter condition regardless of the full width at half maximum in the reflectance spectrum of each of the light reflecting portions 16 to 18. This results from the structure of the combiner 12 that is periodic. Namely, each of the light reflecting portions 16 to 18 included in the combiner 12 is the cholesteric liquid crystal panel and the cholesteric liquid crystal layer 22 in the cholesteric liquid crystal panel has the periodic structure. Therefore, the reflected light satisfies the Bragg condition. If a path difference and a wavelength of light correspond with each other, the Bragg condition is satisfied. As the incident angle becomes larger, the wavelength of light shifts to a short wavelength side. As the incident angle becomes smaller, the wavelength of light shifts to a long wavelength side. In comparison to the condition that the incident angle of the incident light 12L_in is 25 degrees, the wavelength of the light is shifted to the short wavelength side in the condition that the incident angle is 30 degrees. Specifically, when the refractive index of the cholesteric liquid crystal layer 22 is 1.5, about 9 nm of wavelength shift to the short wavelength side occurs. The peak wavelength at the peak in the reflectance spectrum of each of the light reflecting portions 16 to 18 included in the combiner 12 is defined based on the incident light 12L_in that enters the combiner 12 at the middle (the incident angle is 25 degrees). When the incident angle of the incident light 12L_in to the combiner 12 is 25 degrees, the reflectivity is the highest regardless of the full width at half maximum in the reflectance spectrum of each of the light reflecting portions 16 to 18. When the incident angle of the incident light 12L_in to the combiner 12 is 30 degrees, the reflectivity is roughly low when the full width at half maximum in the reflectance spectrum of each of the light reflecting portions 16 to 18 is in a range from 4 nm to 33 nm. However, as the full width at half maximum in the reflectance spectrum is increased, the reflectivity improves. When the full width at half maximum exceeds 33 nm, about the same level of the reflectively as the reflectively achieved when the incident angle is 25 degrees can be achieved. This is because more rays of light with shifted wavelength due to the difference in incident angle are included in the reflectance spectrum as the full width at half maximum in the reflectance spectrum of each of the light reflecting portions 16 to 18 increases. When the full width at half maximum exceeds 33 nm, about all the rays of light with the shifted wavelength may be included in the reflectance spectrum. Because the full width at half maximum in the light emission spectrum of the laser diode, which is a light source, is equal to or smaller than 1 nm, the reflectivity significantly decreases due to the shift of wavelength when the full width at half maximum in the reflectance spectrum of each of the light reflecting portions 16 to 18 is in the range from 4 nm to 33 nm.

Next, a relationship between the full width at half maximum in the reflectance spectrum of each of the light reflecting portions 16 to 18 and the reflectivity of each of the light reflecting portions 16 to 18 will be described. If the full width at half maximum in the reflectance spectrum of each of the light reflecting portions 16 to 18 is in a range from 6 nm to 11 nm, the reflectivity is in a range from 80% to 87.5% when the incident angle of the incident light 12L_in to the combiner 12 is 25 degrees. When the incident angle of the incident light 12L_in to the combiner 12 is 30 degrees, the reflectivity in the above condition is in a range from 10% to 25%. According to the configuration, the virtual image VI projected using the reflected light from the combiner 12 with high brightness is observed by the observer. A large amount of ambient light passing through the combiner 12 is obtained. Therefore, external images according to the ambient light are properly observed by the observer.

If the full width at half maximum in the reflectance spectrum of each of the light reflecting portions 16 to 18 is in a range from 11 nm to 18 nm, the reflectivity is in a range from 87.5% to 90% when the incident angle of the incident light 12L_in to the combiner 12 is 25 degrees. When the incident angle of the incident light 12L_in to the combiner 12 is 30 degrees, the reflectivity in the above condition is in a range from 25% to 40%. According to the configuration, the virtual image VI formed from the reflected light from the combiner 12 with high brightness is observed by the observer. Furthermore, the brightness is sufficiently high even when the observer observes the end of the combiner at an angle. Namely, high display quality is provided.

If the full width at half maximum in the reflectance spectrum of each of the light reflecting portions 16 to 18 is in a range from 18 nm to 90 nm, the reflectivity is in a range from 90% to 95% when the incident angle of the incident light 12L_in to the combiner 12 is 25 degrees. When the incident angle of the incident light 12L_in to the combiner 12 is 30 degrees, the reflectivity in the above condition is in a range from 40% to 95%. According to the configuration, the virtual image VI formed from the reflected light from the combiner 12 with high brightness is observed by the observer. Furthermore, the brightness is higher even when the observer sees the end of the combiner at an angle. Namely, higher display quality is provided. The full width at half maximum in the reflectance spectrum of each of the light reflecting portions 16 to 18 is equal to or less than 90 nm. Therefore, the combiner 12 has at least 70% of transmissivity to transmit ambient light and this satisfies the Japanese safety regulations for road vehicles.

As described earlier, the head-up display (the reflective projection display device) 10 according to this embodiment includes the MEMS mirror component (the display component) 14 and the combiner (the wavelength selective reflecting member) 12. The MEMS mirror component 14 is for displaying images. The combiner 12 is for reflecting light from the MEMS mirror component 14 so that the observer observes the reflected light as the virtual image VI. Furthermore, the combiner 12 is for passing the ambient light. The combiner 12 includes the green light reflecting portion 17, the red light reflecting portion 16, and the blue light reflecting portion 18 that are laid in layers. The green light reflecting portion 17 selectively reflects mainly green light in the green wavelength region. The red light reflecting portion 16 selectively reflects mainly red light in the red wavelength region. The blue light reflecting portion 18 selectively reflects mainly blue light in the blue wavelength region. The green light reflecting portion 17 is arranged the closest to the MEMS mirror component 14.

According to the configuration, the light from the MEMS mirror component 14 for displaying images is reflected by the combiner 12 and the reflected light is observed by the observer as the virtual image VI. The virtual image VI observed by the observer is formed from rays of light in the respective color wavelength regions selectively reflected by the green light reflecting portion 17, the red light reflecting portion 16, and the blue light reflecting portion 18 included in the combiner 12. The combiner 12 reflects the rays of ambient light which correspond with the reflectance spectra of the green light reflecting portion 17, the red light reflecting portion 16, and the blue light reflecting portion 18. However, the combiner 12 passes the rays of ambient light which do not correspond with the reflectance spectra. According to the configuration, the observer can properly observe an external image formed from the rays of ambient light passed through the combiner 12 with the high transmissivity. Furthermore, the observer can observe the virtual image VI projected by using the rays of light reflected by the combiner 12 with high brightness.

Because the light reflecting portions 16 to 18 included in the combiner 12 are laid in layers, the rays of light reflected by one of the light reflecting portions 16 to 18 arranged the farthest from the MEMS mirror component 14 are absorbed by one of the light reflecting portions 16 to 18 arranged the closest to the MEMS mirror component 14. Therefore, the amount of light tends to decrease. The light absorption rates of the light reflecting portions 16 to 18 tend to be higher for the rays of light with short wavelength. Unlike the ambient light, the light from the MEMS mirror component 14 has wavelength dependence on light emission intensity. To maintain the white balance, the green light in the green wavelength region tends to be included in the light with the highest percentage.

Therefore, as described earlier, the green light reflecting portion 17 is arranged the closest to the MEMS mirror component 14 in the combiner 12. The green light in the green wavelength region included with the high percentage to maintain the white balance is effectively reflected and thus the amount of light used for displaying images can be increased while the white balance is maintained at a preferable level. Furthermore, relative luminous efficiency of the green light is higher than that of the red light or the blue light. Therefore, when the amount of light is increased as above, the brightness improves.

Furthermore, the laser diode (the light source) 13 is provided. The laser diode 13 emits at least red light, green light, and blue light to the MEMS mirror component 14. The full width at half maximum in the emission spectrum of each color of light is equal to or less than 1 nm. The full width at half maximum in the reflectance spectrum of the red light reflecting portion 16, the full width at half maximum in the reflectance spectrum of the green light reflecting portion 17, and the full width at half maximum in the reflectance spectrum of the blue light reflecting portion 18 in the combiner 12 are in the range from 6 nm to 11 nm. According to the configuration, the colors of light emitted by the laser diode 13 are reflected by the respective light reflecting portions 16 to 18 in the combiner 12 with the reflectivity in the range from 80% to 87.5%. Therefore, the observer can observe the virtual image VI projected using the rays of light reflected by the combiner 12 with high brightness. The full width at half maximum in the emission spectrum of the laser diode 13 is equal to or less than 1 nm, which is significantly small. Therefore, the reflectivity may significantly decrease when the shift of wavelength occurs in the reflected light due to the variation in incident angle of light to each of the light reflecting portions 16 to 18. On the other hand, each color of light emitted by the laser diode 13 includes a small number of rays of light with wavelengths different from the peak wavelength in the emission spectrum (hereinafter referred to as side lobe light). A larger amount of side lobe light tends to be reflected as the full width at half maximum in the reflectance spectrum of each of the light reflecting portions 16 to 18 increases. By setting the full width at half maximum in the reflectance spectrum of each of the light reflecting portions 16 to 18 as described above, the colors of light emitted by the laser diode 13 are reflected by the respective light reflecting portions 16 to 18 included in the combiner 12 with the reflectivity in the range from 10% to 25% even if the shift of wavelength in the reflected light occurs due to the variation in incident angle of the light relative to each of the light reflecting portions 16 to 18. Therefore, a wide viewing angle is provided for the observer who observes the virtual image VI. The large amount of transmitting ambient light through the combiner 12 is obtained and thus the observer can properly observe the external image according to the ambient light. The shift of the wavelength described above occurs when a condition that the path difference in reflected light and the wavelength of the light correspond with each other when the light reflecting portions 16 to 18 have the periodic structures is satisfied. The wavelength shifts to the short wavelength side as the incident angle increases and to the long wavelength side as the incident angle decreases.

Furthermore, the laser diode 13 is provided. The laser diode 13 emits at least red light, green light, and blue light to the MEMS mirror component 14. The full width at half maximum in the emission spectrum of each color of light is equal to or less than 1 nm. The full width at half maximum in the reflectance spectrum of the red light reflecting portion 16, the full width at half maximum in the reflectance spectrum of the green light reflecting portion 17, and the full width at half maximum in the reflectance spectrum of the blue light reflecting portion 18 in the combiner 12 are in the range from 11 nm to 18 nm. According to the configuration, the colors of light emitted by the laser diode 13 are reflected by the respective light reflecting portions 16 to 18 included in the combiner 12 with the reflectivity in the range from 87.5% to 90%. Therefore, the observer can observe the virtual image VI formed from the rays of light reflected by the combiner 12 with high brightness. The full width at half maximum in the emission spectrum of the laser diode 13 is equal to or less than 1 nm, which is significantly small. Therefore, the reflectivity may significantly decrease when the shift of wavelength occurs in the reflected light due to the variation in incident angle of light to each of the light reflecting portions 16 to 18. On the other hand, each color of light emitted by the laser diode 13 includes a small amount of side lobe light with wavelengths different from the peak wavelength in the emission spectrum. A larger amount of side lobe light tends to be reflected as the full width at half maximum in the reflectance spectrum of each of the light reflecting portions 16 to 18 increases. By setting the full width at half maximum in the reflectance spectrum of each of the light reflecting portions 16 to 18 as described above, the colors of light emitted by the laser diode 13 are reflected by the respective light reflecting portions 16 to 18 included in the combiner 12 with the reflectivity in the range from 25% to 40% even if the shift of wavelength in the reflected light occurs due to the variation in incident angle of the light relative to each of the light reflecting portions 16 to 18. Therefore, a wide viewing angle is maintained for the observer who observes the virtual image VI. According to the configuration, the brightness of the virtual image VI is maintained at a sufficiently high level even when the observer observes the virtual image VI at an angle and thus high display quality is provided.

Furthermore, the laser diode 13 is provided. The laser diode 13 emits at least red light, green light, and blue light to the MEMS mirror component 14. The full width at half maximum in the emission spectrum of each color of light is equal to or less than 1 nm. The full width at half maximum in the reflectance spectrum of the red light reflecting portion 16, the full width at half maximum in the reflectance spectrum of the green light reflecting portion 17, and the full width at half maximum in the reflectance spectrum of the blue light reflecting portion 18 in the combiner 12 are in the range from 18 nm to 90 nm. According to the configuration, the colors of light emitted by the laser diode 13 are reflected by the respective light reflecting portions 16 to 18 included in the combiner 12 with the reflectivity in the range from 90% to 95%. Therefore, the observer can observe the virtual image VI formed from the rays of light reflected by the combiner 12 with high brightness. The full width at half maximum in the emission spectrum of the laser diode 13 is equal to or less than 1 nm, which is significantly small. Therefore, the reflectivity may significantly decrease when the shift of wavelength occurs in the reflected light due to the variation in incident angle of light to each of the light reflecting portions 16 to 18. On the other hand, each color of light emitted by the laser diode 13 includes a small amount of side lobe light with wavelengths different from the peak wavelength in the emission spectrum. A larger amount of side lobe light tends to be reflected as the full width at half maximum in the reflectance spectrum of each of the light reflecting portions 16 to 18 increases. By setting the full width at half maximum in the reflectance spectrum of each of the light reflecting portions 16 to 18 as described above, the colors of light emitted by the laser diode 13 are reflected by the respective light reflecting portions 16 to 18 included in the combiner 12 with the reflectivity in the range from 40% to 95% even if the shift of wavelength in the reflected light occurs due to the variation in incident angle of the light relative to each of the light reflecting portions 16 to 18. Therefore, a wide viewing angle is provided for the observer who observes the virtual image VI. According to the configuration, the brightness of the virtual image VI is maintained at a higher level even when the observer observes the virtual image VI at an angle and thus high display quality is provided. When the full width at half maximum in the reflectance spectrum of each of the light reflecting portions 16 to 18 is maintained equal to or less than 90 nm, the ambient light transmissivity of 70% or higher is achieved and thus the Japanese safety regulations for road vehicles is satisfied.

Furthermore, the red light reflecting portion 16, the green light reflecting portion 17, and the blue light reflecting portion 18 in the combiner 12 are the cholesteric liquid crystal panels. The full width at half maximum of cholesteric crystals can be easily altered at a low cost by changing liquid a crystal material. Therefore, a reflectance spectrum including a specific full width at half maximum can be easily provided at a low cost. Furthermore, the combiner 12 can have polarized light selectivity.

Furthermore, the polarized light converter 24 is disposed on the MEMS mirror component 14 side at least relative to the combiner 12. The polarized light converter 24 is for selectively converting the light from the laser diode into right circularly polarized light or left circularly polarized light. The red light reflecting portion 16, the green light reflecting portion 17, and the blue light reflecting portion 18 in the combiner 12 have polarized light selectivity in addition to the wavelength selectivity. The polarized selectivity of each of the light reflecting portions 16 to 18 corresponds with the polarization properties of the polarized light converter 24. If the polarized light converter is omitted and the combiner 12 does not have the polarized light selectivity, reflected light is more likely to be tinted. According to the configuration described above, the reflected light is less likely to be tinted. If the reflectance spectra of the light reflecting portions 16 to 18 overlap one another, the red light or the blue light, whichever the wavelength thereof is in the reflectance spectrum of the green light reflecting portion 17, is reflected by the green light reflecting portion 17 according to the above configuration. If the red light reflecting portion or the blue light reflecting portion is configured to have the polarization property different from the polarization property of the green light reflecting portion 17, the red light or the blue light, whichever the wavelength thereof is the in the reflectance spectrum of the green light reflecting portion 17, is not reflected by the green light reflecting portion 17. In comparison to the configuration, the amount of light used for displaying images further increases.

Second Embodiment

Figure 15:
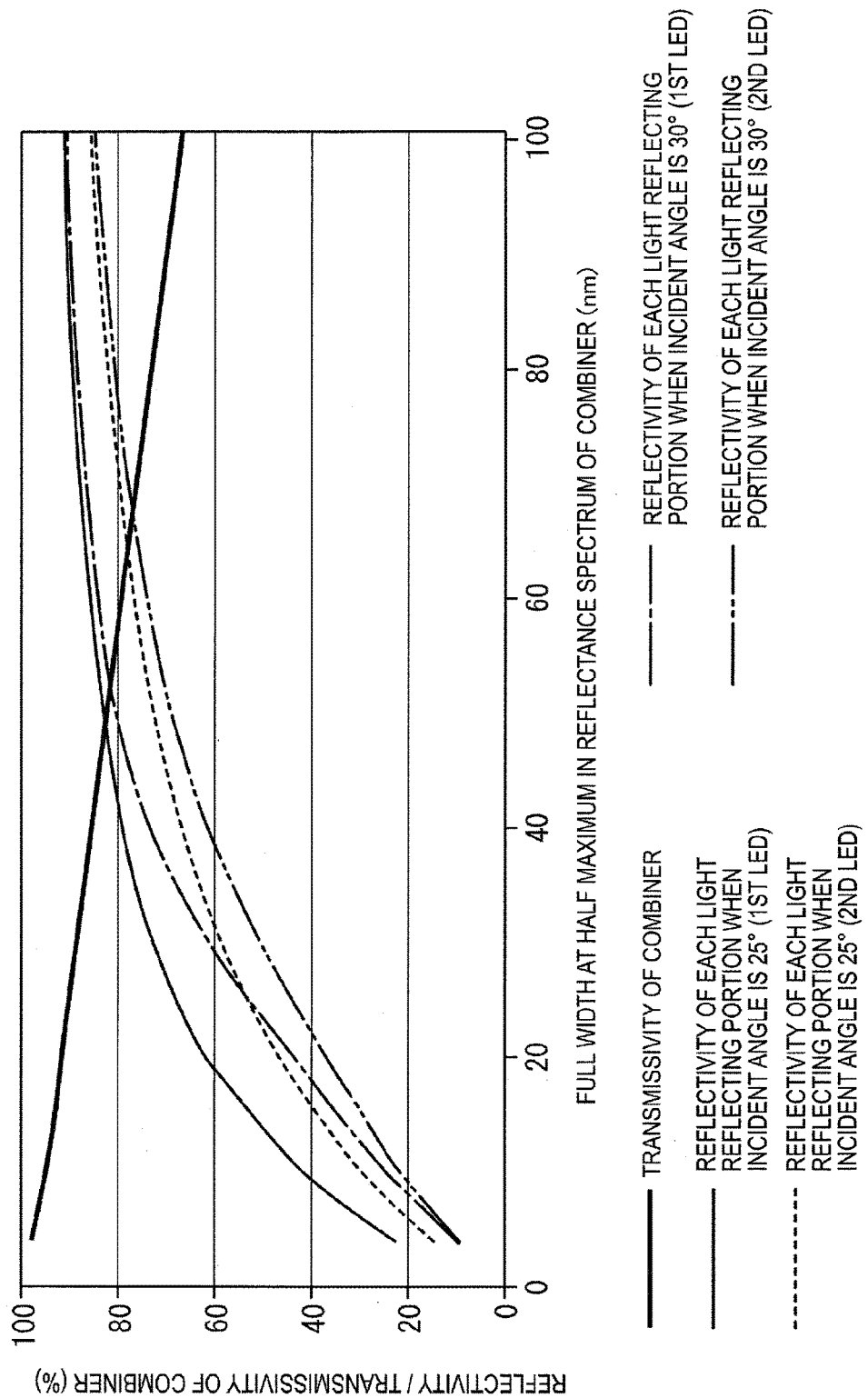
FIG. 15 is relationships between a full width at half maximum in a reflectance spectrum of the combiner and reflectivity of the combiner and between the full width at half maximum and transmissivity of the combiner according to results of comparative experiment 4.

A second embodiment of the present invention will be described with reference to FIGS. 10 and 15. The second embodiment includes an LED 25 that is different from the light source in the first embodiment. Configurations, functions, and effects similar to those of the first embodiment will not be described.

Figure 10:
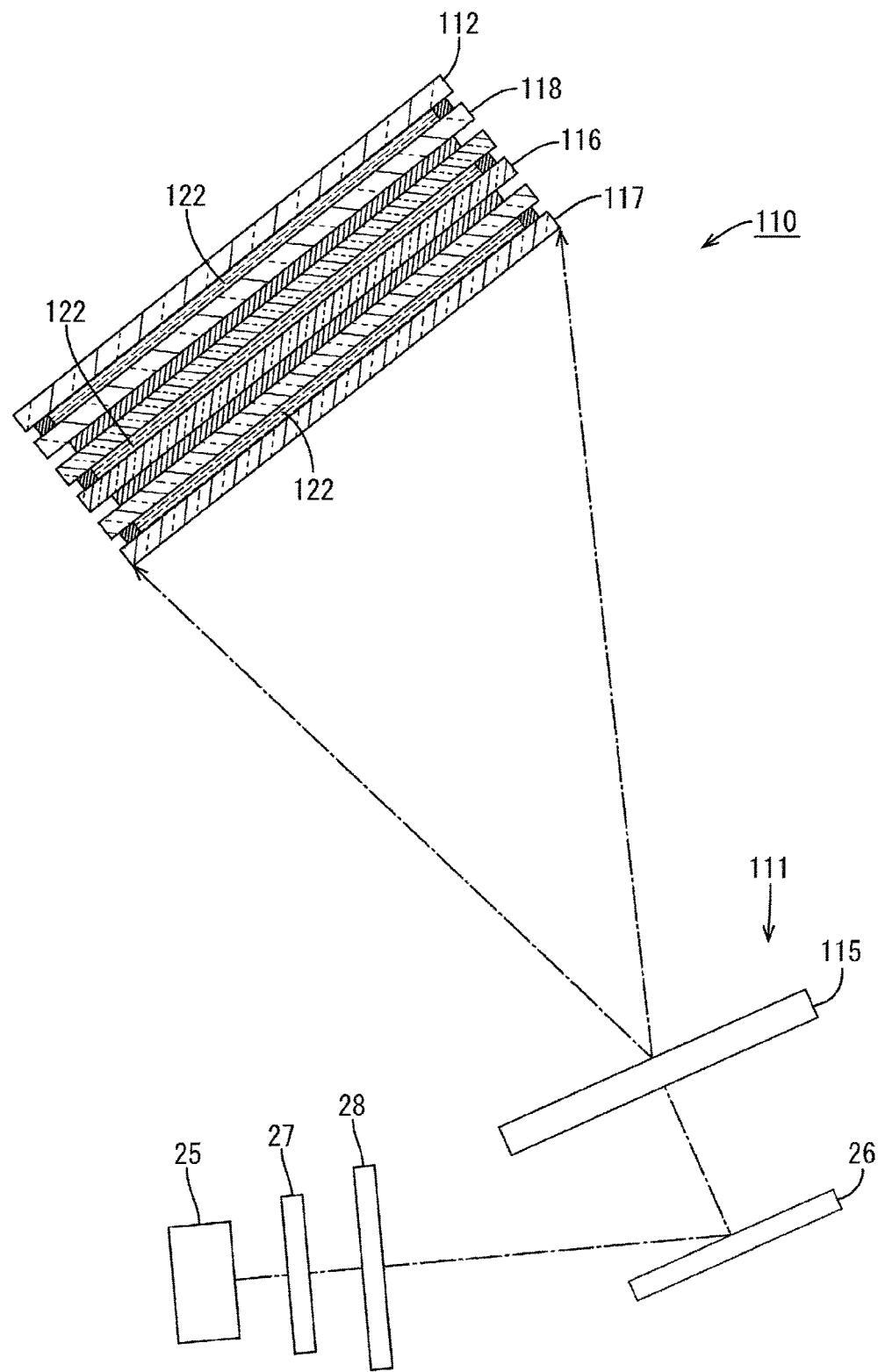
FIG. 10 is a cross sectional view of a head-up display according to the second embodiment of the present invention.
Figure 11:
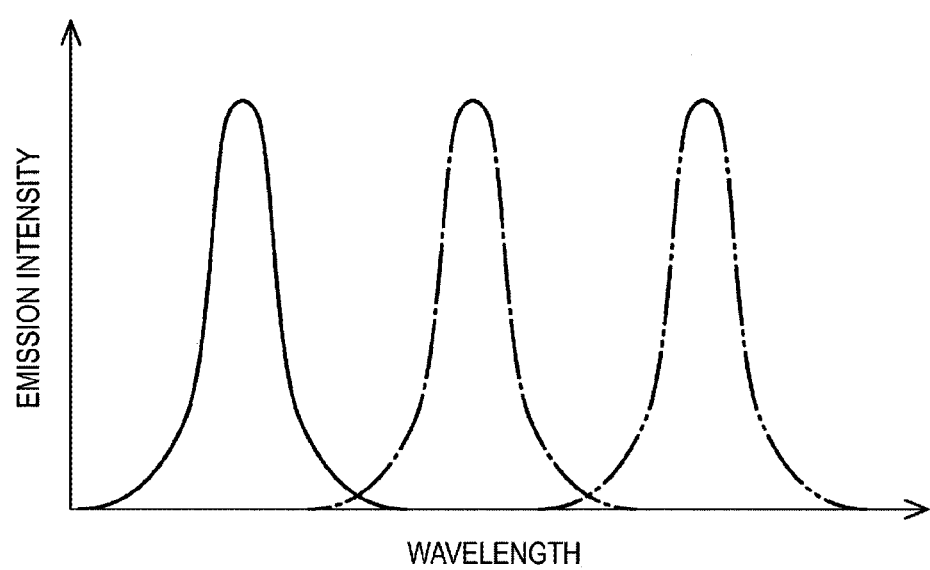
FIG. 11 is a graph illustrating emission spectra of corresponding colors of LED components included in an LED.

As illustrated in FIG. 10, a head-up display 110 according to this embodiment includes the LED 25 as a light source. The LED 25 includes a red LED component, a green LED component, and a blue LED component. The red LED component emits red light with a wavelength in a red wavelength region. The green LED component emits green light with a wavelength in a green wavelength region. The blue LED component emits blue light with a wavelength in a blue wavelength region. The LED 25 is configured such that full widths at half maximum of colors of emitting light in light emission spectra are in a range larger than 1 nm but equal to or smaller than 50 nm. The full widths at half maximum are substantially equal to one another. As illustrated in FIG. 11, the red LED component in the LED 25 has a peak wavelength at a peak in the light emission spectrum about 638 nm. The green LED component has a peak wavelength at a peak in the light emission spectrum about 516 nm. The blue LED component has a peak wavelength at a peak in the light emission spectrum about 450 nm. The LED components that are light emitting sources of the respective colors are not illustrated in the drawing.

The LED 25 emits red light, green light, and blue light in a predefined sequence and predefined timing. Emission intensities with which the respective colors of light are emitted by the LED 25 are adjusted such that images formed from the red light, green light, and the blue light are displayed with specified white balance. Adjustment of the white balance is performed by setting ratios of outputs (currents) of the red LED component, the green LED component, and the blue LED component. Specifically, the white balance is adjusted such that the images are formed from colors of light emitted by the LED 25 with luminous flux ratios of about 26% of red light, about 72% of green light, and about 2% of blue light as illustrated in FIG. 12 (see the third rom from the bottom in FIG. 12). The red LED component, the green LED component, and the blue LED component in the LED 25 have light emission properties such that the maximum luminous fluxes (in unit of "a.u.") are about 5, about 10.0, and about 1.8, respectively (see the top rom in FIG. 12). The maximum luminous flux of each LED component is obtained when the maximum rated current is supplied to the LED component. The maximum luminous flux is calculated by multiplying the light emission intensity by the relative luminous efficiency. The relative luminous efficiencies of the red light, the green light, and the blue light are 0.25, 1.0, and 0.05, respectively. When the green light is emitted by the green LED component with the maximum luminous flux (about 10.0), the outputs of the red LED component and the blue LED component in the LED 25 are adjusted such that the luminous fluxes of the red light and the blue light are about 3.6 and 0.3, respectively (see the second row from the bottom in FIG. 12).

Portions of the head-up display 110 other than the light source also have light polarizing functions. The head-up display 110 according to this embodiment includes a digital micromirror device (DMD) display component 26 instead of the MEMS mirror component 14 in the first embodiment (see FIG. 2). The DMD display component 26 includes micromirrors and semiconductor components (not illustrated). The micromirrors for forming display pixels are arranged in a matrix on a plane. The semiconductor components such as TFTs are for individually controlling operations of the micromirrors. The operations of the micromirrors in the DMD display component 26 are controlled to be synchronized with the light emitting timing of the red light, the green light, and the blue light emitted in the sequence by the LED 25. According to the configuration, amounts of colors of light reflected by the DMD display component 26 are controlled by the micromirrors (display pixels), respectively, and thus color images are displayed. The head-up display 110 further includes a first polarized light converter 27 and a second polarized light converter 28 disposed between the LED 25 and the DMD display component 26. The first polarized light converter 27 converts non-polarized light from the LED 25 into a linearly polarized light. The second polarized light converter 28 selectively converts the linearly polarized light converted by the first polarized light converter 27 into right circularly polarized light and left circularly polarized light. The first polarized light converter 27 includes any one of a PS converter, a polarizing plate, and a reflective-type polarizing plate to convert the non-polarized light from the LED 25 into the linearly polarized light. The second polarized light converter 28 includes a waveplate for producing a ¼λ of phase difference (a quarter-wave plate). The second polarized light converter 28 converts the linearly polarized light from the first polarized light converter 27 into any one of right circularly polarized light and left circularly polarized light. Similar to the first embodiment, light reflecting portions 116 to 118 included in a combiner 112 have polarization properties that correspond with one another and the polarization properties correspond with the polarization properties of the second polarized light converter 28.

Next, the following comparative experiment 3 was conducted to obtain an idea on how a luminous flux of light exiting from the combiner 112 changes, that is, brightness changes when a sequence in which the light reflecting portions 116 are laid in layers is altered. In comparative experiment 3, comparative example 5, comparative example 6, comparative example 7, comparative example 8, example 3, and example 4 were used. The sequence in which the reflecting portions 116 to 118 in the combiner 112 are laid in layers in each example from the DMD display component 26 side or the observer side are as follows. In comparative example 5, the red light reflecting portion 116, the green light reflecting portion 117, and the blue light reflecting portion 118 are laid in this sequence. In comparative example 6, the red light reflecting portion 116, the blue light reflecting portion 118, and the green light reflecting portion 117 are laid in this sequence. In comparative example 7, the blue light reflecting portion 118, the red light reflecting portion 116, and the green light reflecting portion 117 are laid in this sequence. In comparative example 8, the blue light reflecting portion 118, the green light reflecting portion 117, and the red light reflecting portion 116 are laid in this sequence. In example 3, the green light reflecting portion 117, the red light reflecting portion 116, and the blue light reflecting portion 118 are laid in this sequence. In example 4, the green light reflecting portion 117, the blue light reflecting portion 118, and the red light reflecting portion 116 are laid in this sequence. Across-sectional configuration of the combiner 112 in example 4 is similar to that of example 2 in comparative experiment 1 regarding the first embodiment (see FIG. 6). Luminous fluxes of colors of light emitted by the LED 25 that supplies light to the combiner 112 in each of comparative examples 5 to 8 and examples 3 and 4 via the DMD display component 26 and a screen 115 are adjusted such that images formed from reflected light from the combiner 112 are displayed with white balance having a target luminous flux ratio. In this adjustment, any one of the red light, the green light, and the blue light is set to have the maximum luminous flux. The light from the LED 25 adjusted as above is reflected by the combiner 112 in each of the comparative examples 5 to 8 and example 3 and 4. The luminous flux of the reflected light was measured. The results are illustrated in FIGS. 13 and 14. In FIGS. 13 and 14, the sequences of the light reflecting portions 116 to 118 from the DMD display component 26 side or the screen 115 side are indicated with initials in parentheses in cells of comparative examples 5 to 8 and examples 3 and 4, respectively. Methods of calculating values in cells in FIGS. 13 and 14 are similar to those used in comparative experiment 1 regarding the first embodiment and thus will not be described in detail.

The results of comparative experiment 3 will be described. According to FIGS. 13 and 14, in the "LUMINOUS FLUX OF ENTIRE EMITTING LIGHT" row, a value regarding example 3 is the largest, a value regarding example 4 is the second largest, values regarding comparative examples 5 and 8 are the third largest, and those of comparative examples 6 and 7 are the smallest. In each of examples 3 and 4, the green light reflecting portion 117 is in the first layer. In each of comparative examples 5 and 8, the green light reflecting portion 117 is in the second layer. In each of comparative examples 6 and 7, the green light reflecting portion 117 is in the third layer. Namely, "LUMINOUS FLUX OF ENTIRE EMITTING LIGHT" is depending on the position of the green light reflecting portion 117 in the combiner 112. The closer the green light reflecting portion 117 to the DMD display component 26 or the observer, the larger the luminous flux of entire emitting light. The farther the green light reflecting portion 117 from the DMD display component 26 and the observer, the smaller the luminous flux of enter emitting light. Specifically, the green light reflecting portion 117 is in the second layer in each of comparative examples 5 and 8 and thus the green light included in incident light with the highest percentage to obtain target white balance is absorbed by the light reflecting portion in the first layer in the optical path. Therefore, the amount of green light is smaller in comparison to examples 3 and 4. The green light reflecting portion 117 is in the third layer in each of comparative examples 6 and 7 and thus the green light included in incident light with the highest percentage to obtain target white balance is absorbed by the light reflecting portions in the first layer and the second layer in the optical path. Therefore, the amount of green light is smaller in comparison to examples 3 and 4 and comparative examples 5 and 8. The green light reflecting portion 117 is in the first layer in each of examples 3 and 4 and thus the green light included in incident light with the highest percentage to obtain target white balance is effectively reflected by the green light reflecting portion 117 before absorbed by the other light reflecting portions. Therefore, the amount of green light is larger in comparison to comparative examples 5 to 8.

When examples 3 and 4 are compared, the value of "LUMINOUS FLUX OF ENTIRE EMITTING LIGHT" of example 3 is larger than that of example 4. This is because the maximum rated value of the luminous flux of the incident light is calculated based on the red light as illustrated in the second row from the top in FIG. 14. In comparative experiment 2, the red light includes the maximum luminous flux and the green light and the blue light include the luminous fluxes smaller than the maximum luminous flux among the colors of light emitted by the LED 25 to adjust the white balance. The positions of the red light reflecting portion 116 and the blue light reflecting portions 118 in example 4 are reversed from the positions of those in example 3. Therefore, the luminous flux of the green light and the luminous flux of the blue light of example 4 are smaller than those of example 3. Furthermore, the red light including the maximum luminous flux is reflected by the red light reflecting portion 116 in the third layer in example 4 and thus the amount of red light decreases. In example 3, the red light reflecting portion 116 is in the second layer. Therefore, the values of luminous fluxes of the green light and the blue light are larger and the amounts of the red light are larger. In example 3, the amount of each light is larger than that of example 4 and thus the value of luminous flux of entire emitting light is the largest.

Next, the following comparative experiment 4 was conducted to obtain an idea on relationships among a full width at half peak in a reflectance spectrum of each of the light reflecting portions 116 to 118 in the combiner 112, transmissivity of the combiner 112, and reflectivity of each of the light reflecting portions 116 to 118 to reflect a corresponding color of light. In comparative experiment 4, the combiner 112 having the same configuration as that in the example 2 used in comparative experiment 3. In comparative experiment 4, the full width at half peak in the reflectance spectrum of each of the light reflecting portions 116 to 118 in the combiner 112 was varied in a range from 4 nm to 100 nm. The transmissivity of the combiner 112 to pass visible light and the reflectivity of each of the light reflecting portions 116 to 118 to reflect light having a wavelength corresponding with the peak wavelength in the reflectance spectrum was measured. The results are presented in FIG. 15. In FIG. 15, the horizontal axis indicates the full width at half maximum in the reflectance spectrum of each of the light reflecting portions 116 to 118 in the combiner 112 (in unit of "nm"). The vertical axis indicates the transmissivity of the combiner 112 to pass the visible light (in unit of "%") and the reflectivity of each of the light reflecting portions 116 to 118 to reflect the light having the wavelength corresponding with the peak wavelength in the reflectance spectrum of each of the light reflecting portions 116 to 118.

In comparative example 4, a first LED and a second LED are used as light sources. A full width at half maximum in an emitting light spectrum of the first LED is 14 nm. A full width at half maximum in an emitting light spectrum of the second LED is 24 nm. The reflectively was measured in conditions that an incident angle of incident light to the combiner 112 was 25 degrees and that was 30 degrees. The incident angle of the incident light to the combiner 112 indicates a position at which the incident light enters the combiner 112 when a position of a display component unit 111 relative to the combiner 112 is constant. In comparative experiment 4, when the incident angle was 25 degrees, the incident light entered the combiner 112 at the middle of the combiner 112. When the incident angle was 30 degrees, the incident light entered the combiner 112 at one of ends of the combiner 112. Namely, comparative experiment 4 was conducted to examine how the reflectivity varies when the light entered the combiner 112 at the middle of the combiner 112 and when the light entered the combiner 112 at the end of the combiner 112. The transmissivity of the combiner 112 does not have dependency on the incident angle of the incident light. If the light enters the combiner 112 at the other end of the combiner 112, the incident angle of the incident light to the combiner 112 is 20 degrees. The results in such a case may be similar to those when the incident angle is 30 degrees.

The results of comparative experiment 4 will be described. According to FIG. 15, the transmissivity of each of the light reflecting portions 116 to 118 of the combiner 112, that is, the amount of ambient light transmitting through each of the light reflecting portions 116 to 118 increases as the full width at half maximum in the reflectance spectrum of each of the light reflecting portions 116 to 118 decreases. On the other hand, the amount of reflected light for displaying images decreases. As a result, the brightness of the displayed images decreases. The amount of reflected light for displaying images increases and the amount of transmitting ambient light decreases as the full width at half maximum in the reflectance spectrum of each of the light reflecting portions 116 to 118. As a result, visibility of external images decreases. As the full width at half maximum in the reflectance spectrum of each of the light reflecting portions 116 to 118 increases, the amount of reflected light for displaying images increases. This is because the side lobe light use efficiency improves. The side lobe light is included in light emitted by the LED 25.

The reflectivity of the combiner 112 when the incident angle of the incident light from each LED to the combiner 112 is 25 degrees and the reflectivity when the incident angle is 30 degrees are compared, the reflectivity when the incident angle is 25 degrees is significantly higher than the incident angle is 30 degrees regardless of the full width at half maximum in the reflectance spectrum of each of the light reflecting portions 116 to 118. This is because the combiner 112 has the periodic structure. Namely, each of the light reflecting portions 116 to 118 of the combiner 112 includes the cholesteric liquid crystal panel. The cholesteric liquid crystal panel includes the cholesteric liquid layer 122 (see FIG. 10) which has a periodic structure. Therefore, the reflected light satisfies the Bragg condition. If a path difference and a wavelength of light correspond with each other, the Bragg condition is satisfied. As the incident angle becomes larger, the wavelength of light shifts to the short wavelength side. As the incident angle becomes smaller, the wavelength of light shifts to the long wavelength side. In comparison to the condition that the incident angle of the incident light is 25 degrees, the wavelength of the light is shifted to the short wavelength side in the condition that the incident angle is 30 degrees. Specifically, when the refractive index of the cholesteric liquid crystal layer 122 is 1.5, about 9 nm of wavelength shift to the short wavelength side occurs. The peak wavelength at the peak in the reflectance spectrum of each of the light reflecting portions 116 to 118 in the combiner 112 is defined based on the incident light that enters the combiner 112 at the middle (the incident angle is 25 degrees). When the incident angle of the incident light to the combiner 112 is 25 degrees, the reflectivity is the highest regardless of the full width at half maximum in the reflectance spectrum of each of the light reflecting portions 116 to 118. When the incident angle of the incident light to the combiner 112 is 30 degrees, the reflectivity is almost always low regardless of the full width at half maximum in the reflectance spectrum of each of the light reflecting portions 116 to 118. This is because a larger amount of light with the wavelength shifted due to the variation in incident angle is included in the reflectance spectrum as the full width at half maximum in the reflectance spectrum of each of the light reflecting portions 116 to 118. However, the LED 25 in this embodiment (the first LED and the second LED) has the full width at half maximum is 14 nm or 24 nm, which is relatively large in comparison to the laser diode 13 in the first embodiment. Even if the full width at half maximum in the reflectance spectrum of each of the light reflecting portions 116 to 118 is increased, the side lobe light is less likely to be included in the reflectance spectrum due to the wavelength shift. Therefore, the reflectivity is almost always low regardless of the full width at half maximum in the reflectance spectrum of each of the light reflecting portions 116 to 118 when the incident angle of the incident light to the combiner 112 is 30 degrees.

Next, the relationship between the full width at half maximum in the reflectance spectrum of each of the light reflecting portions 116 to 118 and the reflectivity of each of the light reflecting portions 116 to 118 will be described. If the first LED is used and the full width at half maximum in the reflectance spectrum of each of the light reflecting portions 116 to 118 is in a range from 4 nm to 14 nm, the reflectivity to reflect the incident light to the combiner 112 with the incident angle of 25 degrees is in a range from 20% to 50%, and the reflectivity to reflect the incident light to the combiner 112 with the incident angle of 30 degrees is in a range from 10% to 25%. Therefore, the observer observes virtual images formed from the light reflected by the combiner 112 with sufficient brightness. Furthermore, a larger amount of ambient light transmitting through the combiner 112 is obtained and thus the observer can observe proper external images formed from the ambient light. Still furthermore, a wide viewing angle is provided for the observer who observes the virtual images. In comparative experiment 4, the first LED having 14 nm of the full width at half maximum in the emission spectrum. However, as long as the full width at half maximum is within the range from 1 nm to 24 nm, the reflectivity of the combiner 112 is substantially equal to the reflectivity obtained in the above condition. Namely, when the incident angle is 25 degrees, the reflectivity is in the range from 20% to 50%, and when the incident angle is 30 degrees, the reflectivity is in the range from 10% to 25%.

When the first LED is used and the full width at half maximum in the reflectance spectrum of each of the light reflecting portions 116 to 118 is in the range from 14 nm to 40 nm, the reflectivity of the combiner 112 to reflect the incident light with the incident angle of 25 degrees is in the range from 50% to 80%, and the reflectivity of the combiner 112 to reflect the incident light with the incident angle of 30 degrees is in the range from 25% to 40%. According to the configuration, the observer can observe the virtual images formed from the light reflected by the combiner 112 with high brightness. Furthermore, the larger amount of ambient light transmitting through the combiner 112 is obtained and thus the observer can observe the proper external images formed from the ambient light. Still furthermore, a wide viewing angle is provided for the observer who observes the virtual images. In comparative experiment 4, the first LED having 14 nm of the full width at half maximum in the emission spectrum. However, as long as the full width at half maximum is within the range from 1 nm to 24 nm, the reflectivity of the combiner 112 is substantially equal to the reflectivity obtained in the above condition. Namely, when the incident angle is 25 degrees, the reflectivity is in the range from 50% to 80%, and when the incident angle is 30 degrees, the reflectivity is in the range from 25% to 40%.

When the first LED is used and the full width at half maximum in the reflectance spectrum of each of the light reflecting portions 116 to 118 is in the range from 40 nm to 90 nm, the reflectivity of the combiner 112 to reflect the incident light with the incident angle of 25 degrees is in the range from 80% to 90%, and the reflectivity of the combiner 112 to reflect the incident light with the incident angle of 30 degrees is in the range from 40% to 90%. According to the configuration, the observer can observe the virtual images formed from the light reflected by the combiner 112 with high brightness. Furthermore, the brightness is higher even when the observer observes the end of the combiner at an angle. Namely, higher display quality is provided. The full width at half maximum in the reflectance spectrum of each of the light reflecting portions 116 to 118 is equal to or less than 90 nm. Therefore, the combiner 112 has at least 70% of transmissivity to transmit ambient light and this satisfies the Japanese safety regulations for road vehicles. In comparative experiment 4, the first LED has 14 nm of the full width at half maximum in the emission spectrum. However, as long as the full width at half maximum is within the range from 1 nm to 24 nm, the reflectivity of the combiner 112 is substantially equal to the reflectivity obtained in the above condition. Namely, when the incident angle is 25 degrees, the reflectivity is in the range from 80% to 90%, and when the incident angle is 30 degrees, the reflectivity is in the range from 40% to 90%.

When the second LED is used and the full width at half maximum in the reflectance spectrum of each of the light reflecting portions 116 to 118 is in the range from 4 nm to 23 nm, the reflectivity of the combiner 112 to reflect the incident light with the incident angle of 25 degrees is in the range from 20% to 50%, and the reflectivity of the combiner 112 to reflect the incident light with the incident angle of 30 degrees is in the range from 10% to 25%. According to the configuration, the observer can observe the virtual images formed from the light reflected by the combiner 112 with sufficient brightness. Furthermore, the larger amount of ambient light transmitting through the combiner 112 is obtained and thus the observer can observe the proper external images formed from the ambient light. Still furthermore, a wide viewing angle is provided for the observer who observes the virtual images. In comparative experiment 4, the second LED has 24 nm of the full width at half maximum in the emission spectrum. However, as long as the full width at half maximum is within the range from 24 nm to 50 nm, the reflectivity of the combiner 112 is substantially equal to the reflectivity obtained in the above condition. Namely, when the incident angle is 25 degrees, the reflectivity is in the range from 20% to 50%, and when the incident angle is 30 degrees, the reflectivity is in the range from 10% to 25%.

When the second LED is used and the full width at half maximum in the reflectance spectrum of each of the light reflecting portions 116 to 118 is in the range from 23 nm to 71 nm, the reflectivity of the combiner 112 to reflect the incident light with the incident angle of 25 degrees is in the range from 50% to 80%, and the reflectivity of the combiner 112 to reflect the incident light with the incident angle of 30 degrees is in the range from 25% to 40%. According to the configuration, the observer can observe the virtual images formed from the light reflected by the combiner 112 with higher brightness. Furthermore, the larger amount of ambient light transmitting through the combiner 112 is obtained and thus the observer can observe the proper external images formed from the ambient light. Still furthermore, a wide viewing angle is provided for the observer who observes the virtual images. In comparative experiment 4, the second LED has 24 nm of the full width at half maximum in the emission spectrum. However, as long as the full width at half maximum is within the range from 24 nm to 50 nm, the reflectivity of the combiner 112 is substantially equal to the reflectivity obtained in the above condition. Namely, when the incident angle is 25 degrees, the reflectivity is in the range from 50% to 80%, and when the incident angle is 30 degrees, the reflectivity is in the range from 25% to 40%.

When the second LED is used and the full width at half maximum in the reflectance spectrum of each of the light reflecting portions 116 to 118 is in the range from 71 nm to 90 nm, the reflectivity of the combiner 112 to reflect the incident light with the incident angle of 25 degrees is in the range from 80% to 90%, and the reflectivity of the combiner 112 to reflect the incident light with the incident angle of 30 degrees is in the range from 40% to 90%. According to the configuration, the observer can observe the virtual images formed from the light reflected by the combiner 112 with high brightness. Furthermore, the brightness is higher even when the observer observes the end of the combiner at an angle. Namely, higher display quality is provided. The full width at half maximum in the reflectance spectrum of each of the light reflecting portions 116 to 118 is equal to or less than 90 nm. Therefore, the combiner 112 has at least 70% of transmissivity to transmit ambient light and this satisfies the Japanese safety regulations for road vehicles. In comparative experiment 4, the second LED has 24 nm of the full width at half maximum in the emission spectrum. However, as long as the full width at half maximum is within the range from 24 nm to 50 nm, the reflectivity of the combiner 112 is substantially equal to the reflectivity obtained in the above condition. Namely, when the incident angle is 25 degrees, the reflectivity is in the range from 80% to 90%, and when the incident angle is 30 degrees, the reflectivity is in the range from 40% to 90%.

According to this embodiment, as described above, the head-up display 110 includes the LED (the light source) 25 that emits at least the red light, the green light, and the blue light to the DMD display component (the display component) 26. The full width at half maximum in the emission spectrum of each color of light is in the range from 1 nm to 24 nm. The full width at half maximum in the reflectance spectrum of each of the red light reflecting portion 116, the green light reflecting portion 117, and the blue light reflecting portion 118 of the combiner 112 is in the range from 4 nm to 14 nm. Each color of light emitted by the LED 25 includes the light having the wavelength that is shifted from the peak wavelength in the emission spectrum (hereinafter referred to as side lobe light). The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the reflectivity in the range from 20% to 50%. According to the configuration, the observer can observe the virtual images formed from the light reflected by the combiner 112 with sufficient brightness. Furthermore, the larger amount of ambient light transmitting through the combiner 112 is obtained and thus the observer can observe the proper external images formed from the ambient light. Still furthermore, a wide viewing angle is provided for the observer who observes the virtual images. Even if the shift of wavelength in the reflected light occurs due to the variation in incident angle of the incident light to each of the light reflecting portions 116 to 118, each color of light emitted by the LED 25 is reflected by the corresponding one of the light reflecting portions 116 to 118 of the combiner 112 with the reflectivity in the range from 10% to 25%. Therefore, a wide viewing angle is provided for the observer who observes the virtual image. The shift of the wavelength described above occurs when a condition that the path difference in reflected light and the wavelength of the light correspond with each other when the light reflecting portions 116 to 118 have the periodic structures is satisfied. The wavelength shifts to the short wavelength side as the incident angle increases and to the long wavelength side as the incident angle decreases.

The head-up display 110 includes the LED 25 that emits at least the red light, the green light, and the blue light to the DMD display component 26. The full width at half maximum in the emission spectrum of each color is in the range from 1 nm to 24 nm. The full width at half maximum in the reflectance spectrum of each of the red light reflecting portion 116, the green light reflecting portion 117, and the blue light reflecting portion 118 of the combiner 112 is in the range from 14 nm to 40 nm. Each color of light emitted by the LED 25 includes the side lobe light having the wavelength that is shifted from the peak wavelength in the emission spectrum. The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the sufficiently high reflectivity in the range from 50% to 80%. According to the configuration, the observer can observe the virtual images formed from the light reflected by the combiner 112 with higher brightness. Furthermore, the sufficient amount of ambient light transmitting through the combiner 112 is obtained and thus the observer can observe the proper external images formed from the ambient light. Even if the shift of wavelength in the reflected light occurs due to the variation in incident angle of the incident light to each of the light reflecting portions 116 to 118, by setting the full width at half maximum in the reflectance spectrum of each of the light reflecting portions 116 to 118, each color of light emitted by the LED 25 is reflected by the corresponding one of the light reflecting portions 116 to 118 of the combiner 112 with the reflectivity in the range from 25% to 40%. Therefore, a wide viewing angle is provided for the observer who observes the virtual image.

The head-up display 110 includes the LED 25 that emits at least the red light, the green light, and the blue light to the DMD display component 26. The full width at half maximum in the emission spectrum of each color is in the range from 1 nm to 24 nm. The full width at half maximum in the reflectance spectrum of each of the red light reflecting portion 116, the green light reflecting portion 117, and the blue light reflecting portion 118 of the combiner 112 is in the range from 40 nm to 90 nm. Each color of light emitted by the LED 25 includes the side lobe light having the wavelength that is shifted from the peak wavelength in the emission spectrum. The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the higher reflectivity in the range from 80% to 90%. According to the configuration, the observer can observe the virtual images formed from the light reflected by the combiner 112 with higher brightness. Even if the shift of wavelength in the reflected light occurs due to the variation in incident angle of the incident light to each of the light reflecting portions 116 to 118, by setting the full width at half maximum in the reflectance spectrum of each of the light reflecting portions 116 to 118, each color of light emitted by the LED 25 is reflected by the corresponding one of the light reflecting portions 116 to 118 of the combiner 112 with the reflectivity in the range from 40% to 90%. Therefore, a wide viewing angle is provided for the observer who observes the virtual image. The full width at half maximum in the reflectance spectrum of each of the light reflecting portions 116 to 118 is equal to or less than 90 nm. Therefore, the combiner 112 has at least 70% of transmissivity to transmit ambient light and this satisfies the Japanese safety regulations for road vehicles.

The head-up display 110 includes the LED 25 that emits at least the red light, the green light, and the blue light to the DMD display component 26. The full width at half maximum in the emission spectrum of each color is in the range from 24 nm to 50 nm. The full width at half maximum in the reflectance spectrum of each of the red light reflecting portion 116, the green light reflecting portion 117, and the blue light reflecting portion 118 of the combiner 112 is in the range from 4 nm to 23 nm. Each color of light emitted by the LED 25 includes the side lobe light having the wavelength that is shifted from the peak wavelength in the emission spectrum. The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the reflectivity in the range from 20% to 50%. According to the configuration, the observer can observe the virtual images formed from the light reflected by the combiner 112 with sufficient brightness. Furthermore, the larger amount of ambient light transmitting through the combiner 112 is obtained and thus the observer can observe the proper external images formed from the ambient light. Even if the shift of wavelength in the reflected light occurs due to the variation in incident angle of the incident light to each of the light reflecting portions 116 to 118, by setting the full width at half maximum in the reflectance spectrum of each of the light reflecting portions 116 to 118, each color of light emitted by the LED 25 is reflected by the corresponding one of the light reflecting portions 116 to 118 of the combiner 112 with the reflectivity in the range from 10% to 25%. Therefore, a wide viewing angle is provided for the observer who observes the virtual image.

The head-up display 110 includes the LED 25 that emits at least the red light, the green light, and the blue light to the DMD display component 26. The full width at half maximum in the emission spectrum of each color is in the range from 24 nm to 50 nm. The full width at half maximum in the reflectance spectrum of each of the red light reflecting portion 116, the green light reflecting portion 117, and the blue light reflecting portion 118 of the combiner 112 is in the range from 23 nm to 71 nm. Each color of light emitted by the LED 25 includes the side lobe light having the wavelength that is shifted from the peak wavelength in the emission spectrum. The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the sufficiently high reflectivity in the range from 50% to 80%. According to the configuration, the observer can observe the virtual images formed from the light reflected by the combiner 112 with sufficient brightness. Furthermore, the larger amount of ambient light transmitting through the combiner 112 is obtained and thus the observer can observe the proper external images formed from the ambient light. Even if the shift of wavelength in the reflected light occurs due to the variation in incident angle of the incident light to each of the light reflecting portions 116 to 118, by setting the full width at half maximum in the reflectance spectrum of each of the light reflecting portions 116 to 118, each color of light emitted by the LED 25 is reflected by the corresponding one of the light reflecting portions 116 to 118 of the combiner 112 with the reflectivity in the range from 25% to 40%. Therefore, a wide viewing angle is provided for the observer who observes the virtual image.

The head-up display 110 includes the LED 25 that emits at least the red light, the green light, and the blue light to the DMD display component 26. The full width at half maximum in the emission spectrum of each color is in the range from 1 nm to 24 nm. The full width at half maximum in the reflectance spectrum of each of the red light reflecting portion 116, the green light reflecting portion 117, and the blue light reflecting portion 118 of the combiner 112 is in the range from 71 nm to 90 nm. Each color of light emitted by the LED 25 includes the side lobe light having the wavelength that is shifted from the peak wavelength in the emission spectrum. The larger the full width at half peak in the reflectance spectrum of each of the light reflecting portions 116 to 118, the larger the amount of side lobe light reflected. Therefore, by setting the full width at half maximum in the reflectance spectrum of each of the light reflecting portions 116 to 118 as described above, each color of light emitted by the LED 25 is reflected by the corresponding one of the light reflecting portions 116 to 118 of the combiner 112 with the higher reflectivity in the range from 80% to 83%. According to the configuration, the observer can observe the virtual images formed from the light reflected by the combiner 112 with higher brightness. Even if the shift of wavelength in the reflected light occurs due to the variation in incident angle of the incident light to each of the light reflecting portions 116 to 118, by setting the full width at half maximum in the reflectance spectrum of each of the light reflecting portions 116 to 118, each color of light emitted by the LED 25 is reflected by the corresponding one of the light reflecting portions 116 to 118 of the combiner 112 with the reflectivity in the range from 40% to 83%. Therefore, a wide viewing angle is provided for the observer who observes the virtual image. The full width at half maximum in the reflectance spectrum of each of the light reflecting portions 116 to 118 is equal to or less than 90 nm. Therefore, the combiner 112 has at least 70% of transmissivity to transmit ambient light and this satisfies the Japanese safety regulations for road vehicles.

In the combiner 112, the blue light reflecting portion 118 is arranged the farthest from the DMD display component 26. If the red light reflecting portion is arranged the farthest from the DMD display component 26, to adjust the white balance, the brightness of light in the red wavelength region included in the light from the DMD display component 26 may be the highest while the brightness of light in the green wavelength region and the brightness of light in the blue wavelength region may be lower than the highest brightness. As described above, with the blue light reflecting portion 118 arranged the farthest from the DMD display component 26, the light from the DMD display component 26 includes light in the green wavelength region with the highest brightness and light in the red wavelength region and in the blue wavelength region with the brightness lower than the highest brightness. Namely, the brightness of the light in the green wavelength region is relatively high. Furthermore, a larger amount of light in the red wavelength region reflected by the red light reflecting portion 116 is obtained. According to the configuration, the largest amount of light used for displaying images is obtained.

Third Embodiment

A third embodiment of the present invention will be described with reference to FIG. 16. The third embodiment includes a combiner 212 different from that of the first embodiment. Configurations, functions, and effects similar to those of the first embodiment will not be described.

Figure 16:
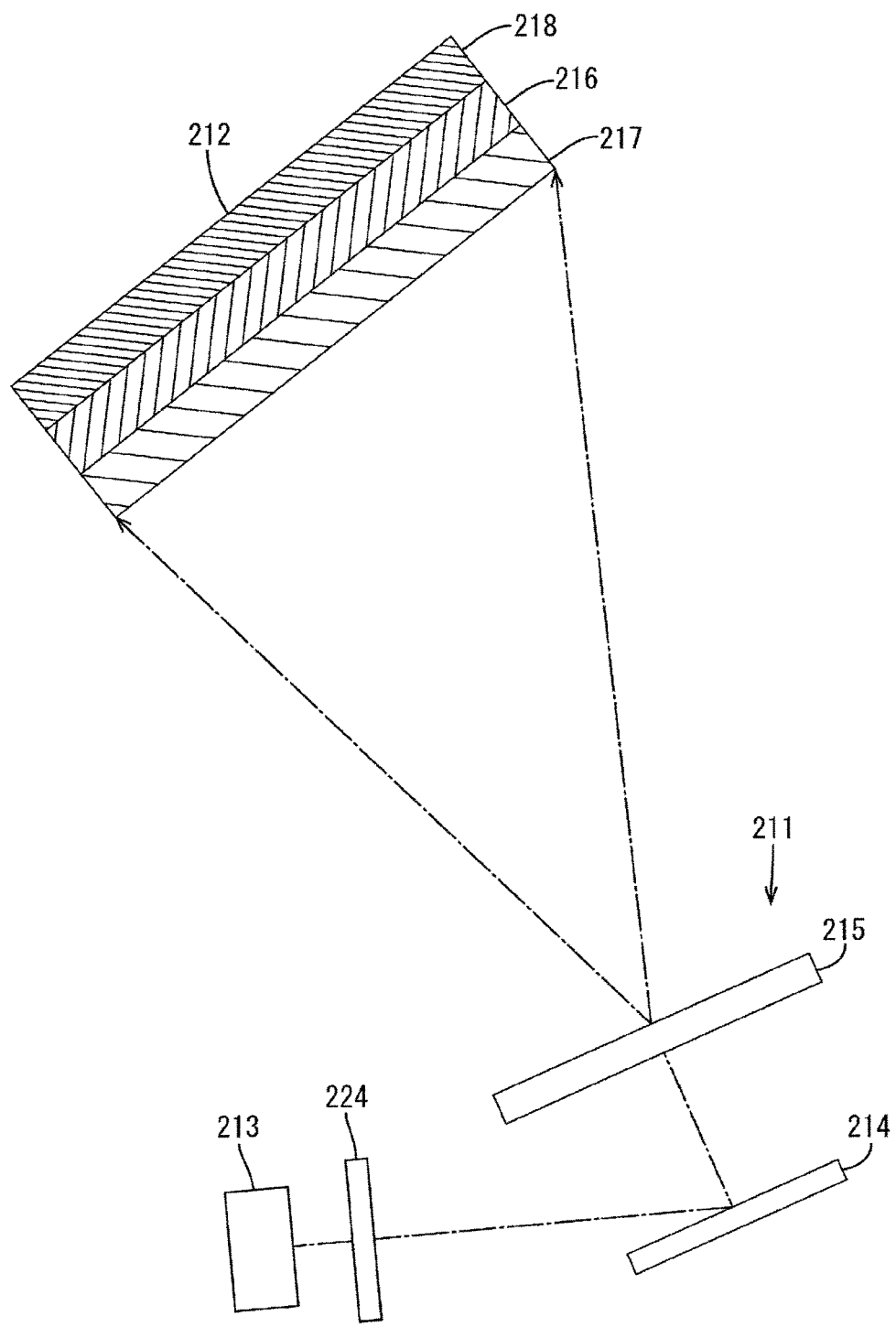
FIG. 16 is a cross-sectional view illustrating a combiner according to a third embodiment of the present invention.

As illustrated in FIG. 16, the combiner 212 according to this embodiment includes light reflecting portions 216 to 218 that are holographic components laid in layers. The holographic components have wavelength selectivity to reflect a specific wavelength component with high reflectivity. Specifically, the holographic components have the wavelength selectivity such that the holographic components have high diffraction efficiency for light having a wavelength around a specific wavelength used to produce the holographic components. The holographic component of the red light reflecting portion 216 reflects mainly red light. The holographic component of the green light reflecting portion 217 reflects mainly green light. The holographic component of the blue light reflecting portion 218 reflects mainly blue light. In the combiner 212 including such holographic components, the green light reflecting portion 217 is arranged the closest to a display component unit 211. According to the configuration, functions and effects similar to those of the first embodiment are achieved. The display component unit 211 includes a laser diode 213, a MEMS mirror component 214, a screen 215, and a polarized light converter 224 having configurations similar to those of the first embodiment.

Fourth Embodiment

A fourth embodiment of the present invention will be described with reference to FIG. 17. The fourth embodiment includes a combiner 312 different from that of the first embodiment. Configurations, functions, and effects similar to those of the first embodiment will not be described.

Figure 17:
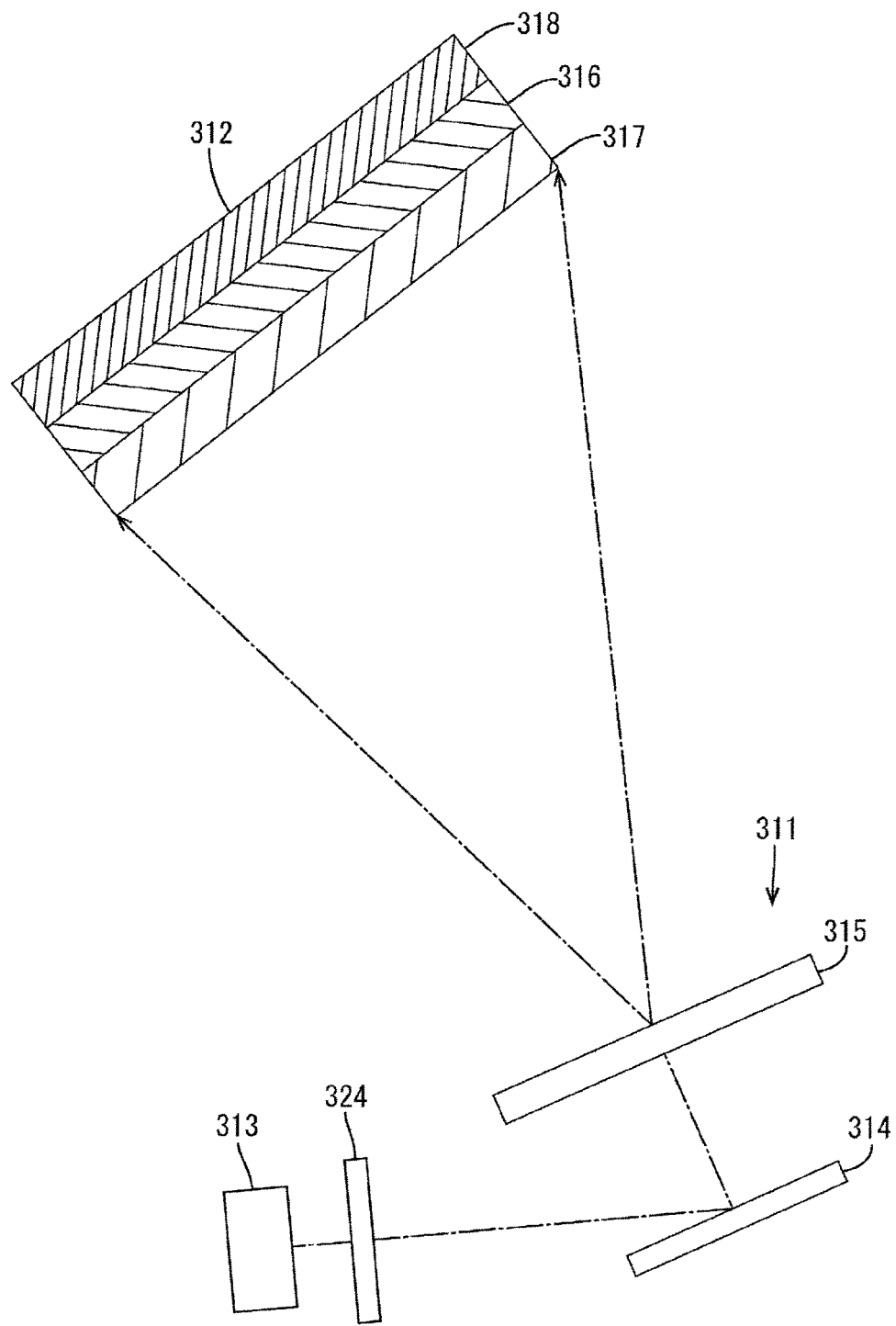
FIG. 17 is a cross-sectional view illustrating a combiner according to a fourth embodiment of the present invention.

As illustrated in FIG. 17, the combiner 312 according to this embodiment includes light reflecting portions 316 to 318 that are dielectric multi-layer films laid in layers. Each dielectric multi-layer film is formed from light transmissive thin films having different refractive indexes. The dielectric multi-layer films have wavelength selectivity to reflect a specific wavelength component with high reflectivity similarly to the cholesteric liquid crystal panels and the holographic components described earlier. The dielectric multi-layer film of the red light reflecting portion 316 reflects mainly red light. The dielectric multi-layer film of the green light reflecting portion 317 reflects mainly green light. The dielectric multi-layer film of the blue light reflecting portion 318 reflects mainly blue light. In the combiner 312 including such dielectric multi-layer films, the green light reflecting portion 317 is arranged the closest to a display component unit 311. According to the configuration, functions and effects similar to those of the first embodiment are achieved. The display component unit 311 includes a laser diode 313, a MEMS mirror component 314, a screen 315, and a polarized light converter 324 having configurations similar to those of the first embodiment.

Fifth Embodiment

A fifth embodiment of the present invention will be described with reference to FIG. 18. The fifth embodiment includes a liquid crystal display device 29 instead of the laser diode in the first embodiment. Configurations, functions, and effects similar to those of the first embodiment will not be described.

Figure 18:
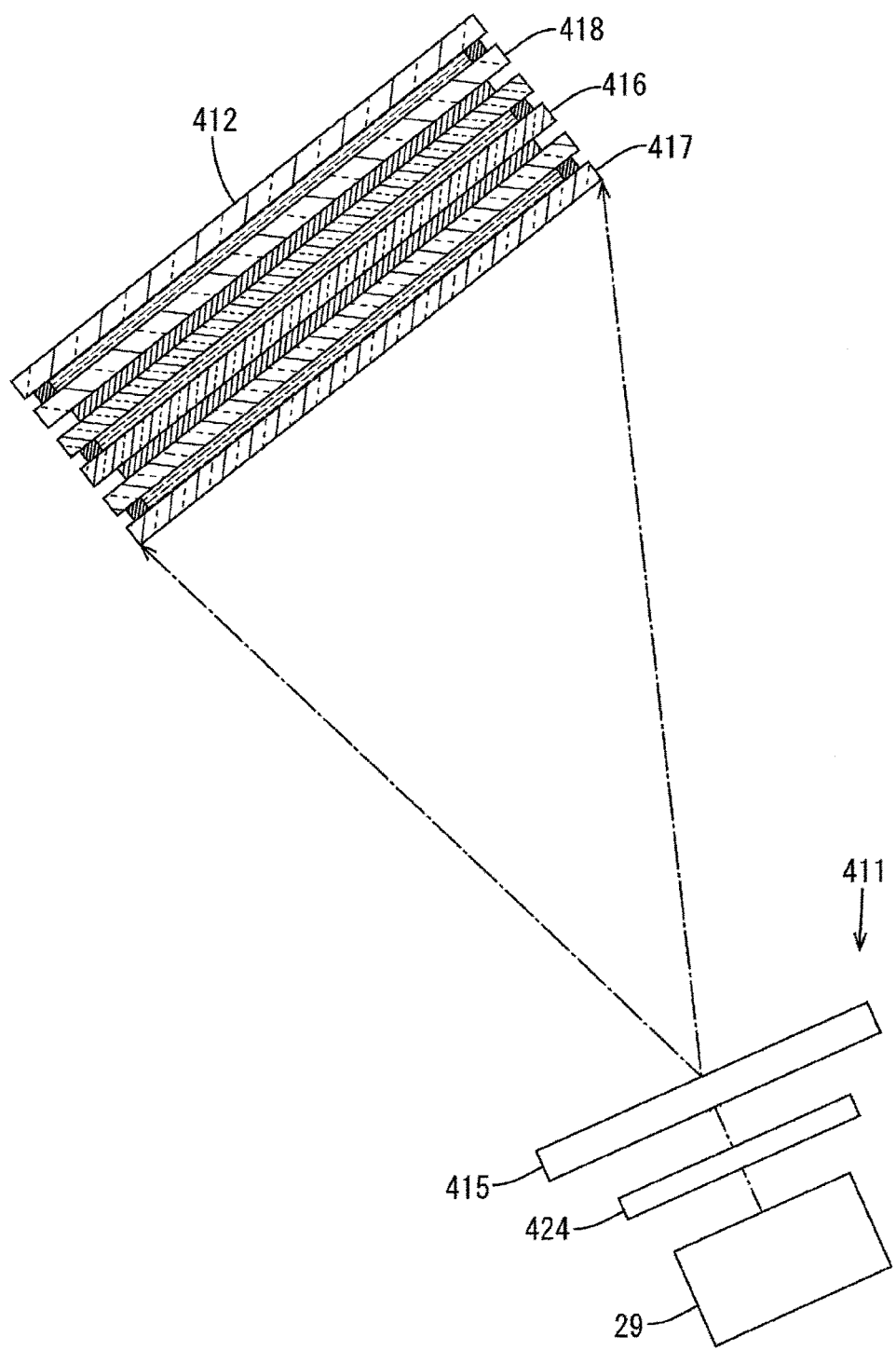
FIG. 18 is a cross-sectional view illustrating a combiner according to a fifth embodiment of the present invention.

As illustrated in FIG. 18, this embodiment includes the liquid crystal display device 29 as a light source for a display component unit 411. The liquid crystal display device 29 includes a liquid crystal panel for displaying images and a backlight unit for supplying light to the liquid crystal panel for displaying images. The backlight unit includes an LED as a light source. Light exiting from the liquid crystal panel is a linearly polarized light. A polarized light converter 424 is disposed between the liquid crystal display device 29 and the screen 415. The polarized light converter 424 is for converting the linearly polarized light into circularly polarized light. The polarized light converter 424 includes a retarder (a quarter-wave retarder) configured to cause a ¼λ phase difference. Linearly polarized light exiting from the liquid crystal display device 29 is converted into any one of the right circularly polarized light and the left circularly polarized light. Similar to the first embodiment, light reflecting portions 416 to 418 included in a combiner 412 have polarization properties that correspond with one another and the polarization properties correspond with the polarization properties of a polarized light converter 424. In the combiner 412 including such a liquid crystal display device 29 as a light source, the green light reflecting portion 417 is arranged the closest to a display component unit 411. According to the configuration, functions and effects similar to those of the first embodiment are achieved.

Sixth Embodiment

A sixth embodiment of the present invention will be described with reference to FIG. 19. This embodiment includes a combiner 512 that includes light reflecting portions 516 to 518 having polarization properties different from the first embodiment. Configurations, functions, and effects similar to those of the first embodiment will not be described.

Figure 19:
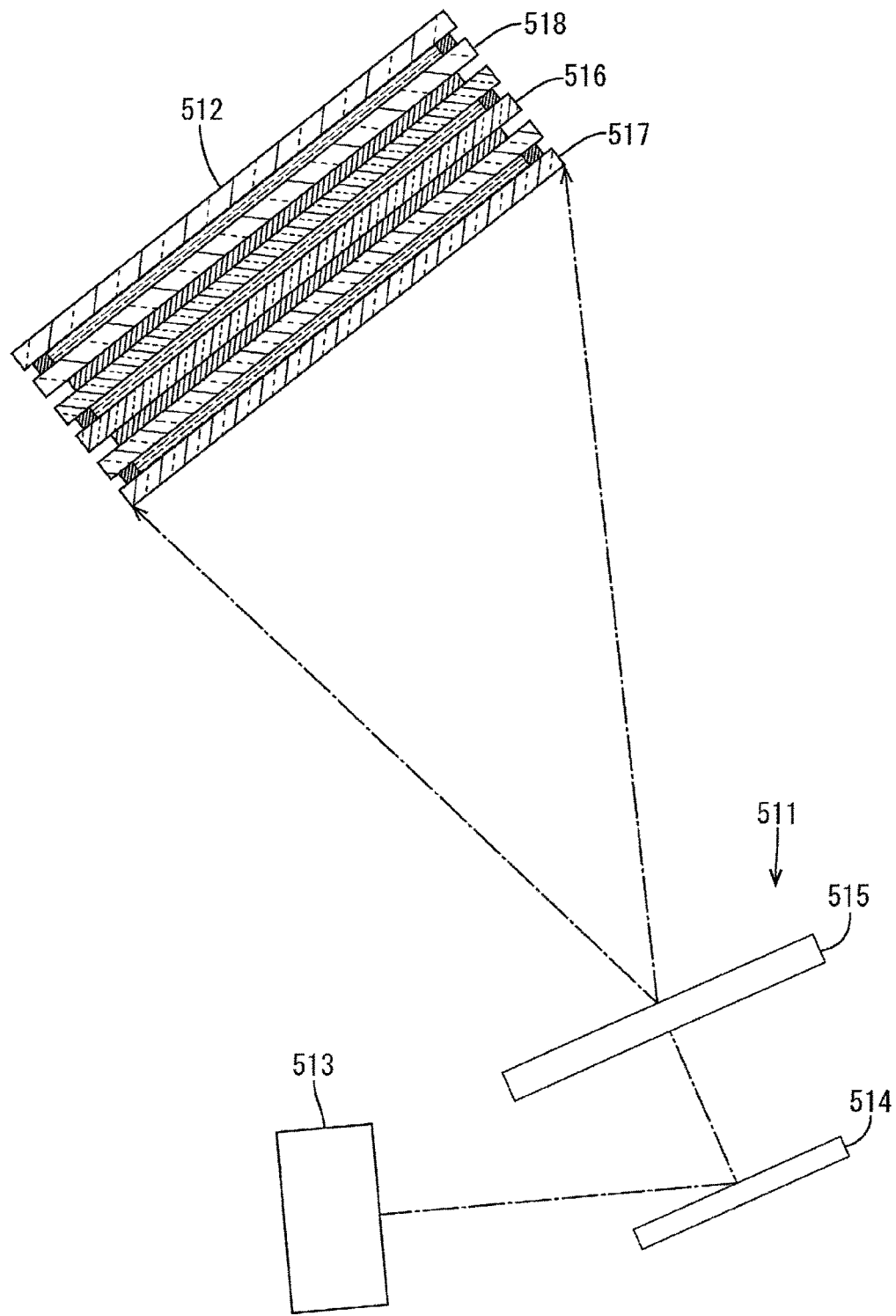
FIG. 19 is a cross-sectional view illustrating a combiner according to a sixth embodiment of the present invention.

As illustrated in FIG. 19, the light reflecting portions 516 to 518 of the combiner 512 according to this embodiment include one that has the polarization property different from others. Specifically, the red light reflecting portion 516 and the blue light reflecting portion 518 of the combiner 512 have the polarization properties to selectivity reflect right circularly polarized light while the green light reflecting portion 517 has the polarization properly to selectively reflect left circularly polarized light. The linearly polarized light is a combination of right circularly polarized light and left circularly polarized light. In this embodiment, both right circularly polarized light and left circularly polarized light are supplied to the combiner 512 as incident light. Linearly polarized light from a laser diode 513 is directly supplied to the combiner 512. Namely, this embodiment does not include the polarized light converter 24 in the first embodiment. The display component unit 511 includes the laser diode 513, a MEMS mirror component 514, and a screen 515 having configurations similar to those of the first embodiment.

According the above configuration, if reflectance spectra of the light reflecting portions 516 to 518 overlap one another, the green light reflecting portion 517 in the first layer reflects green left circularly polarized light. Furthermore, the green light reflecting portion 517 reflects left circularly polarized light having a wavelength overlapping the reflectance spectrum of the green light reflecting portion 517 among the red light and the blue light. The green right circularly polarized light passes through the green light reflecting portion 517. The red light reflecting portion 516 in the second layer reflects red right circularly polarized light and right circularly polarized light having a wavelength overlapping the reflectance spectrum of the red light reflecting portion 516 among the green light and the blue light. The blue light reflecting portion 518 in the third layer reflects blue right circularly polarized light and right circularly polarized light having a wavelength overlapping the reflectance spectrum of the blue light reflecting portion 516 in the green light. According to the configuration, the green right circularly polarized light that is not used in the first embodiment is used as reflected light. Therefore, an amount of light used for displaying images further increases.

Other Embodiments

The present invention is not limited to the embodiments, which have been described using the foregoing descriptions and the drawings. For example, embodiments described below are also included in the technical scope of the present invention.

(1) The maximum luminous flux of the laser diode or the LED may be altered as appropriate from each of the above embodiments. In such a case, "LUMINOUS FLUX OF EXITING LIGHT WITH WHITE BALANCE ADJUSTED BASED ON GREEN LIGHT" and other values may be calculated based on the altered maximum luminous flux to obtain "LUMINOUS FLUX OF ENTIRE EXITING LIGHT."

(2) The luminous flux ratio to achieve the target white balance may be altered as appropriate from each of the above embodiments. In such a case, "LUMINOUS FLUX OF EXITING LIGHT WITH WHITE BALANCE ADJUSTED BASED ON GREEN LIGHT" and other values may be calculated based on the altered maximum luminous flux to obtain "LUMINOUS FLUX OF ENTIRE EXITING LIGHT."

(3) The absorption rates of the light reflecting portions in the combiner to absorb the respective colors of light may be altered as appropriate from each of the above embodiments. In such a case, "LUMINOUS FLUX OF INCIDENT LIGHT TO OBTAIN EXITING LIGHT WITH ADJUSTED WHITE BALANCE" and other values may be calculated based on the altered absorption rates to obtain "LUMINOUS FLUX OF ENTIRE EXITING LIGHT."

(4) In each of the first, the third, the fourth, and the sixth embodiments, the laser diode having equal to or less than 1 nm of the full width at half maximum in the emission spectrum is used as a light source. Specifically, if the full width at half maximum in the emission spectrum of the laser diode is in the range from 1 nm to 24 nm, the full width at half maximum in the reflectance spectrum of each of the light reflecting portions in the combiner may be set in the range from 4 nm to 14 nm. According to the configuration, the reflectivity to reflect the light at the middle of the combiner is at least 20% or higher and lower than 50%. If the full width at half maximum in the reflectance spectrum of each of the light reflecting portions in the combiner in the range from 14 nm to 40 nm, the reflectivity to reflect the light at the middle of the combiner is at least 50% or higher and lower than 80%. If the full width at half maximum in the reflectance spectrum of each of the light reflecting portions in the combiner in the range from 40 nm to 90 nm, the reflectivity to reflect the light at the middle of the combiner is at least 80% or higher. If the full width at half maximum in the emission spectrum of the laser diode is in the range from 24 nm to 50 nm, the full width at half maximum in the reflectance spectrum of each of the light reflecting portions in the combiner may be set in the range from 4 nm to 23 nm. According to the configuration, the reflectivity to reflect the light at the middle of the combiner is at least 20% or higher and lower than 50%. If the full width at half maximum in the reflectance spectrum of each of the light reflecting portions in the combiner in the range from 23 nm to 71 nm, the reflectivity to reflect the light at the middle of the combiner is at least 50% or higher and lower than 80%. If the full width at half maximum in the reflectance spectrum of each of the light reflecting portions in the combiner in the range from 71 nm to 90 nm, the reflectivity to reflect the light at the middle of the combiner is at least 80% or higher. In any of the above cases, 70% or higher transmissivity to transmit the ambient light is obtained.

(5) In comparative experiment 4 described in the second embodiment section, the first LED and the second LED are used as light sources. The full width at half maximum in the emission spectrum of the first LED is 14 nm. The full width at half maximum in the emission spectrum of the second LED is 24 nm. The full widths at half maximums in the emissions spectra of the LEDs may be altered as appropriate. Specifically, if the full width at half maximum in the emission spectrum of each LED is in the range from 1 nm to 24 nm, the full width at half maximum in the reflectance spectrum of each of the light reflecting portions of the combiner may be set in the range from 4 nm to 14 nm. According to the configuration, the reflectivity to reflect the light at the middle of the combiner is at least 20% or higher and lower than 50%. If the full width at half maximum in the reflectance spectrum of each of the light reflecting portions in the combiner in the range from 14 nm to 40 nm, the reflectivity to reflect the light at the middle of the combiner is at least 50% or higher and lower than 80%. If the full width at half maximum in the reflectance spectrum of each of the light reflecting portions in the combiner in the range from 40 nm to 90 nm, the reflectivity to reflect the light at the middle of the combiner is at least 80% or higher. If the full width at half maximum in the emission spectrum of each LED is in the range from 24 nm to 50 nm, the full width at half maximum in the reflectance spectrum of each of the light reflecting portions of the combiner may be set in the range from 4 nm to 23 nm. According to the configuration, the reflectivity to reflect the light at the middle of the combiner is at least 20% or higher and lower than 50%. If the full width at half maximum in the reflectance spectrum of each of the light reflecting portions in the combiner in the range from 23 nm to 71 nm, the reflectivity to reflect the light at the middle of the combiner is at least 50% or higher and lower than 80%. If the full width at half maximum in the reflectance spectrum of each of the light reflecting portions in the combiner in the range from 71 nm to 90 nm, the reflectivity to reflect the light at the middle of the combiner is at least 80% or higher. The full width at half maximum in the emission spectrum of each LED may be set equal to or less than 1 nm. In this case, the full width at half maximum in the reflectance spectrum of each of the light reflecting portions may be set in the range from 6 nm to 11 nm. According to the configuration, the reflectivity to reflect the light at the middle of the combiner is at least 20% or higher and lower than 50%. If the full width at half maximum in the reflectance spectrum of each of the light reflecting portions in the combiner in the range from 11 nm to 18 nm, the reflectivity to reflect the light at the middle of the combiner is at least 50% or higher and lower than 80%. If the full width at half maximum in the reflectance spectrum of each of the light reflecting portions in the combiner in the range from 18 nm to 90 nm, the reflectivity to reflect the light at the middle of the combiner is at least 80% or higher. In any of the above cases, 70% or higher transmissivity to transmit the ambient light is obtained.

(6) In each of the third, the fourth, and the sixth embodiments, an LED such as in the second embodiment may be used as a light source instead of the laser diode. Alight source other than the laser diode or the LED may be used in each of the above embodiments (e.g., an organic EL). In such a case, a full width at half maximum in an emission spectrum of the light source and a full width at half maximum in the reflectance spectrum of each of the light reflecting portions may be set in the ranges as described in the above other embodiment (5). According to the configuration, the same function as that in the above other embodiment (5) is achieved.

(7) In the fifth embodiment, a cold cathode tube or an organic EL may be used as a light source in the liquid crystal display device.

(8) In the fifth embodiment, a self-light emitting display component such as an organic EL panel and a PDP may be used instead of the liquid crystal display device.

(9) In each of the above embodiments, the combiner is held by the sun visor or other holding member at the position separated from the front windshield. However, the combiner may be attached to the front windshield. Alternatively, if the front windshield includes two glasses that are laminated, the combiner may be sandwiched between the glasses.

(10) In each of the above embodiments, the display component unit is held in the dashboard. However, the display component unit may be held by the sun visor or hung from a ceiling of the vehicle.

(11) In each of the above embodiment sections, the head-up display to be installed on the vehicle is described as an example. However, the scope of the present invention may be applied to head-up displays to be installed on airplanes, motorcycles, driving simulators for entertainment or any other machines of such a kind.

(12) In each of the above embodiments sections, the head-up display to be installed on the vehicle is described as an example. However, the scope of the present invention may be applied to head mounted displays.

(13) In each of the above embodiments, the reflectivity to reflect light having the wavelength included in the peak in the reflectance spectrum of each of the light reflecting portions in the combiner (cholesteric liquid crystal panel) is 90% and the reflectivity to reflect light having the wavelength that is not included in the peak in the reflectance spectrum is 10%. However, the reflectivity may be altered as appropriate.

(14) In the first embodiment, the MEMS mirror component includes two shafts including the driving portions that are perpendicular to each other and the mirror is supported by the shafts. However, two mirrors may be provided and one of the mirrors may be supported by one of shafts that are perpendicular to each other and the other mirror may be supported by the other shaft. In such a case, light may be directed to the screen to two-dimensionally scan the screen by adjusting angles of the mirrors. According to the configuration, two-dimensional images are displayed on the screen. The configuration of the MEMS mirror component may be altered from the above configuration as appropriate. The MEMS mirror component in the first embodiment may be used in the second embodiment that includes the LED as a light source. The DMD display component in the second embodiment may be used in the first embodiment that includes the laser diode as a light source.

EXPLANATION OF SYMBOLS

10, 110: head-up display (reflective projection type display device), 12, 112, 212, 312, 412, 512: combiner (wavelength selective reflecting member), 13, 213, 313, 513: laser diode (light source), 14, 214, 314, 514: MEMS mirror component (display component), 16, 116, 216, 316, 416, 516: red light reflecting portion, 17, 117, 217, 317, 417, 517: green light reflecting portion, 18, 118, 218, 318, 418, 518: blue light reflecting portion, 24, 224, 324, 424: polarized light converter, 25: LED (light source), 26: DMD display component (display component), 27: first polarized light converter (polarized light converter), 28: second polarized light converter (polarized light converter), 29: liquid crystal display device (display device), VI: virtual image

The invention claimed is:
1. A reflective projection display device comprising:
 a display component for display images; and
 a wavelength selective reflecting member for reflecting light from the display component so that an observer observes reflected light as a virtual image and for transmitting ambient light, the wavelength selective reflecting member comprising:
  a green light reflecting portion for selectively reflecting mainly green light in a green wavelength region;
  a red light reflecting portion for selectively reflecting mainly red light in a red wavelength region; and
  a blue light reflecting portion for selectively reflecting mainly blue light in a blue wavelength region, and;
 a polarized light converter;
 wherein the green light reflecting portion, the red light reflecting portion, and the blue light reflecting portion are laid in layers;

wherein the green light reflecting portion is arranged the closest to the display component;

wherein the polarized light converter selectively converts light into left circularly converted light or right circularly converted light, the polarized light converter is arranged on a display component side relative to at least the wavelength selective reflecting member;

wherein each of the red light reflecting portion, the green light reflecting portion, and the blue light reflecting portion of the wavelength selective reflecting member has polarized light selectivity in addition to the wavelength selectivity; and wherein each of the red light reflecting portion, the green light reflecting portion, and the blue light reflecting portion of the wavelength selective reflecting member has polarization property corresponding with polarization properly of the polarized light converter.

2. The reflective projection display device according to claim 1, further comprising a light source for supplying the red light, the green light, and the blue light, wherein
a full width at half maximum in an emission spectrum of each color of light is equal to or less than 1 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 6 nm to 11 nm exclusive.

3. The reflective projection display device according to claim 1, further comprising a light source for supplying the red light, the green light, and the blue light, wherein
a full width at half maximum in an emission spectrum of each color of light is equal to or less than 1 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 11 nm to 18 nm exclusive.

4. The reflective projection display device according to claim 1, further comprising a light source for supplying the red light, the green light, and the blue light, wherein
a full width at half maximum in an emission spectrum of each color of light is equal to or less than 1 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 18 nm to 90 nm inclusive.

5. The reflective projection display device according to claim 1, further comprising a light source for supplying the red light, the green light, and the blue light, wherein
a full width at half maximum in an emission spectrum of each color of light is in a range larger than 1 nm and smaller than 24 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 4 nm to 14 nm exclusive.

6. The reflective projection display device according to claim 1, further comprising a light source for supplying the red light, the green light, and the blue light, wherein
a full width at half maximum in an emission spectrum of each color of light is in a range larger than 1 nm and smaller than 24 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 14 nm to 40 nm exclusive.

7. The reflective projection display device according to claim 1, further comprising a light source for supplying the red light, the green light, and the blue light, wherein
a full width at half maximum in an emission spectrum of each color of light is in a range larger than 1 nm and smaller than 24 nm, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 40 nm to 90 nm inclusive.

8. The reflective projection display device according to claim 1, further comprising a light source for supplying the red light, the green light, and the blue light, wherein
a full width at half maximum in an emission spectrum of each color of light is in a range from 24 run to 50 nm inclusive, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 4 nm to 23 nm exclusive.

9. The reflective projection display device according to claim 1, further comprising a light source for supplying the red light, the green light, and the blue light, wherein
a full width at half maximum in an emission spectrum of each color of light is in a range from 24 nm to 50 nm inclusive, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 23 nm to 71 nm exclusive.

10. The reflective projection display device according to claim 1, further comprising a light source for supplying the red light, the green light, and the blue light, wherein
a full width at half maximum in an emission spectrum of each color of light is in a range from 24 nm to 50 nm inclusive, and
a full width at half maximum in a reflectance spectrum of the red light reflecting portion, a full width at half maximum in a reflectance spectrum of the green light reflecting portion, and a full width at half maximum in a reflectance spectrum of the blue light reflecting portion are in a range from 71 nm to 90 nm inclusive.

11. The reflective projection display device according to claim 1, wherein the red light reflecting portion, the green light reflecting portion, and the blue light reflecting portion of the wavelength selective reflecting member include cholesteric liquid crystal panels.

12. The reflective projection display device according to claim 1, wherein the blue light reflecting portion of the wavelength selective reflecting member is arranged the farthest from the display component.

* * * * *